(12) United States Patent
Alden

(10) Patent No.: US 6,445,509 B1
(45) Date of Patent: Sep. 3, 2002

(54) VARIABLE FRESNEL TYPE STRUCTURES AND PROCESS

(76) Inventor: Ray Marvin Alden, 808 Lake Brandon Trail, Raleigh, NC (US) 27610

( * ) Notice: Subject to any disclaimer, the term of this patent is extended or adjusted under 35 U.S.C. 154(b) by 0 days.

(21) Appl. No.: 09/575,601

(22) Filed: May 22, 2000

Related U.S. Application Data

(60) Provisional application No. 60/201,031, filed on May 1, 2000, provisional application No. 60/149,059, filed on Aug. 16, 1999, and provisional application No. 60/162,988, filed on Nov. 1, 1999.

(51) Int. Cl.$^7$ .............................. G02B 3/14; G02B 3/08; G02B 7/182
(52) U.S. Cl. ........................ 359/666; 359/667; 359/742; 359/743; 359/851; 359/853
(58) Field of Search .................................. 359/665, 666, 359/667, 742, 743, 851, 852, 853

(56) References Cited

U.S. PATENT DOCUMENTS

| | | | |
|---|---|---|---|
| 4,614,405 A | 9/1986 | Brandenberg et al. ...... 350/286 |
| 4,890,902 A | 1/1990 | Doane et al. ............... 350/347 |
| 4,890,903 A | 1/1990 | Treisman et al. ........... 350/419 |
| 5,124,836 A | * 6/1992 | Kikuchi ...................... 359/665 |
| 5,166,831 A | 11/1992 | Hart ........................... 359/832 |
| 5,541,776 A | 7/1996 | Kobayashi et al. ......... 359/665 |
| 5,684,637 A | 11/1997 | Floyd ......................... 359/666 |
| 5,760,871 A | * 6/1998 | Kosoburd et al. ........... 359/665 |
| 5,774,273 A | 6/1998 | Bornhorst ................... 359/665 |
| 5,794,023 A | 8/1998 | Hobbs et al. ............... 359/565 |
| 5,796,531 A | 8/1998 | Kaneda et al. .............. 359/832 |

FOREIGN PATENT DOCUMENTS

| | | | |
|---|---|---|---|
| JP | 59-87402 | * | 5/1984 |
| JP | 1-230004 | * | 9/1989 |

OTHER PUBLICATIONS

Roddier, Francois, 1999, Adaptive Optics In Astronomy, Cambridge University Press, pp. 57–90.
Pedrotti, Frank, Pedrotti, Leno, 1993, Introduction To Optics, Prentice Hall, pp. 349–365.
Alloin, D.M., Mariotti, J.M., 1994, Adaptive Optics for Astronomy, Kluwer Academic Publishing, pp. 149–161, 1994.

* cited by examiner

Primary Examiner—Scott J. Sugarman

(57) ABSTRACT

In the lens embodiment, the invention described herein incorporates a first fluid with a first refractive index in a first series of concentric zones and a second fluid with a second refractive index in a second series of concentric zones. The two zones being adjacent to one another alternating between a concentric circle of the first then a concentric circle of the second then the first and etc. Wherein each circular zone in the series of first and second fluid zones are separated by a transparent barrier with elasticity. Additionally, fluid can be added or subtracted to each concentric circle as desired through ports in their otherwise sealed chambers. The structure and process described produces a refractive and/or diffractive optical component which is predictably and reliably variable as to its focal length and transmittance direction. In the mirror embodiment, a the membrane is coated with a reflective material and is operated to form variable angles and curves and correspondingly variable focal lengths.

40 Claims, 19 Drawing Sheets

VARIABLE FRESNEL TYPE STRUCTURES AND PROCESS

CROSS-REFERENCE TO RELATED APPLICATIONS

This application is entitled to the benefit of patent application 09/358,175 filed 07/20/99, and of Provisional Patent Application Ser. No. 60/149,059 filed Aug. 16, 1999, and of Provisional Patent Application Ser. No. 60/162,988 filed Nov. 01, 1999, and of Provisional Patent Application Ser. No. 60/201,031 filed May 01, 2000.

BACKGROUND FIELD OF INVENTION

This invention relates to optical surfaces commonly referred to as Fresnel surfaces. Fresnel surfaces are commonly used to direct and/or focus light in desirable ways and have remained largely unchanged since their invention nearly 200 years ago. Such surfaces commonly consist of either rigid prism surfaces arranged concentrically on an often flat surface or rigid curved surfaces arranged concentrically often on a flat surface. Fresnel optical devices utilize either diffraction and/or refraction, or reflection to direct light as desired. The general advantages of Fresnel optics include the performance simulation of optical lenses, prisms, and mirrors with a significant reduction of material, thickness and consequently dramatically lighter weight and less bulky optics.

BACKGROUND-DESCRIPTION OF PRIOR ART

Heretofore, the designs of concentric, flattened lens, prism, and mirror structures have always been rigid and have been otherwise not variable. Commonly these concentric circles were cut or molded into transparent plastic or glass. The angles and curves once cut thereon not being variable. Adding flexibility to similar structures as described herein is now possible due to the many advances in the transparency and elasticity of polymer technology. Transparent highly elastic extrusions welded and assembled as described herein are tunable by increasing and decreasing the quantity of two fluids therein (a first fluid with a first refractive index and a second fluid with a second refractive index). The angles and curves formed by the fluids due to the surfaces there between, due to elastic transparent membrane walls, cause light to be redirected as desired through the processes of refraction and/or diffraction. Moreover identical structures coated with a reflective material and operated identically forms a mirror whereby electromagnetic energy is redirected to a focal point by the process of reflection.

Prior art teaches the use of flexible membranes such as is depicted in FIG. 1 from U.S. Pat. No. 5,684,637 (Floyd, 1997). The membranes are actuated to form a convex lens of desired focal length by varying a fluid with a refractive index contained there between. This structure and those abundantly found in prior art that are similarly actuated when used in small applications can reliably provide a range of focal lengths and coherent focal points. In many applications however, especially where the volume, physical size and weight of fluid are a consideration, an alternate approach utilizing Fresnel structures to provide coherent variable focal lengths is needed. The present invention achieves these objects with significantly reduced thickness, weight and volume.

Prior art teaches the use of a flexible mirror membrane actuated by fluid pressure such as is depicted in FIG. 2 from U.S. Pat. No. 4,890,903 (Treisman et al, 1990). Such a fluid mirror membrane can be used in some small applications where thickness is not a factor. In larger applications or where absolute mirror thickness is a consideration, the variable membrane mirror composed of Fresnel zones as disclosed herein is a usefull unanticipated advancement over the prior art.

Prior art teaches the use of actuating rigid structures to reliably alter the path of electromagnetic energy. FIG. 3 from U.S. Pat. No. 5,166,831 (Hart, 1992) discloses the actuation of rigid planar members to vary a liquid prism angle. This and similar prior art is useful for some small applications. In large applications, the volume, physical size and weight of fluid required in these structures makes them prohibitive engineering problems. To elimnate the engineering problems of prior art, an alternate approach utilizing variable Fresnel structures to variably alter the course of electromagnetic radiation is required. Additionally, the Hart structure can not achieve a variable focal length (nor did Hart intend it to).

Prior art discloses the use of variable lenslets. FIG. 4 from U.S. Pat. No. 5,774,273 (Bornhorst, 1998) depicts a hexagonal grid and a membrane. This system uses fluid pressure to push the membrane through the grid and thereby produces an array of variable lenslets. This lenslet array can not achieve a truly coherent focal point. Nor can this structure reliably deliver a single variable focal point. Additionally, due to the grid structure, much of the electromagnetic radiation is lost into the grid. The hexagonal structure is used to minimize the light loss due to absorption by the grid structure (if the grid had round holes, the grid would absorb even more energy). But the hexagonal structure introduces the problem of lenslet distortion because the curvature of the membrane will be distorted into a rippled curve (caused by non uniform stretching when conforming to the hexagonal shape) when being stretched through anything other than a round structure. The round hole and smooth curve are required for imaging optics. The Bornhorst grid structure forces a compromise between the loss of optical integrity when using a hexagonal grid and loss of optical efficiency when using a round grid. The present invention can achieve the objects of a variable coherent focal point and length with nearly one hundred percent efficiency and with nearly no distortion. For all of these reasons, the new art embodied in the variable Fresnel structure disclosed in the present application is a significant unanticipated advancement over prior art.

Prior art FIG. 5 from U.S. Pat. No. 5,774,273 (Bornhorst, 1998) incorporates several independently variable arrays of fluid pressure variable lenslets into one collective structure. Again, the structure disclosed can not deliver a truly coherent focal point. Nor can it produce a variable focal point. This structure and the actuation methodology is not adequate for the purposes of a coherent variable lens with variable focal point and focal length. Each of these independent lenslet arrays can be directed into a similar direction but their grid shapes and positioning prohibit usage in any imaging optics applications. The new art disclosed in the present application avoids the problems associated with the grid structure by not using one. Further all of the new structures of the present invention can be used together to produce a coherent optic with variable focal length and a true focal point. These are all significant advancements unanticipated, unaddressed, and unachievable by prior art.

The variable prismatic surface of prior art FIG. 6 from U.S. Pat. No. 5,774,273 (Bornhorst, 1998) can incoherently simulate a focal point. This may be adequate for some imprecise lighting applications but is not adequate for any coherent applications. Specifically since the riser of the structure is not parallel to the light source, (but instead forms a second surface in the path of the light) a high percentage of light is either absorbed, reflected, or refracted by the secondary angle formed by the riser. This causes light rays to travel in undesired directions and further increases waste within the system Waste of energy may be tolerable where excess energy can be pumped into the system such as in some lighting applications where efficiency is not a factor. But such waste is not tolerable in a coherent optical system especially where input energy is finite. Moreover the art taught in Bornhorst teaches that lenslet surfaces may be either variable with respect to curvature or be variable with respect to angle. None of the prior art membranes are variable with respect to both angular pitch and curvature. The new art disclosed in the present application efficiently and coherently redirects electromagnetic energy. Surfaces of the present application are true variable concentric Fresnel structures that can be varied with respect to angular pitch and curvature simultaneously.

After a review of prior art it becomes clear that a coherent variable focal length lens with a true focal point in the form of a concentric Fresnel structure has neither been anticipated nor achieved in the prior art. Thus, the new art disclosed herein solves problems unanticipated and unaddressed in the prior art. Disclosed herein is the use of concentric elastic stretchable and collapsible surfaces which enable one optical device to incorporate alterable Fresnel zones or surface angles and surface curves. Such alterations are made to be permanently variable such that one optical device has alterable focal lengths or can otherwise continually be reconfigured in real time to redirect electromagnetic radiation as desired.

Our society increasing relies on accurately and reliably directing electromagnetic radiation for communications, science, photography, illumination, entertainment, telescopy, medicine, and magnification etc. Flexible concentric circular structures as described herein add important advantages for these and other important objects. Moreover, abundant and valuable benefits provided by such structures have been heretofore unrecognized and not addressed in prior art.

SUMMARY

In the lens embodiment, the invention described herein incorporates a first fluid with a first refractive index in a first series of concentric zones and a second fluid with a second refractive index in a coplanar second series of concentric zones. The two zones being adjacent to one another alternating between a concentric circle of the first then a concentric circle of the second then the first and etc. Wherein each circular zone in the series of first and second fluid zones are separated by a transparent barrier with elasticity. Additionally, fluid can be added or subtracted to each concentric circle as desired through ports in their otherwise sealed chambers. The structure and process described produces a refractive and/or diffractive optical component which is variable as to its focal length and transmittance direction. In the lens embodiment, a reflective material is covering the membrane to produce a Fresnel mirror with a focal point.

OBJECTS AND ADVANTAGES

Accordingly, several objects and advantages of my invention are apparent. Lenses and mirrors manufactured by the method described have alterable focal lengths. Once deployed in the field they can be tuned to direct electromagnetic energy as desired. They then can be retuned to many different specifications repeatedly and predictably. The applications for lenses and mirrors with a variable focus length are far too numerous to individually enumerate herein. Clearly objects such as illumination, entertainment, communications, science, photography, telescopy, medicine, and magnification (among many others) will all benefit from this new technology.

Further objects and advantages will become apparent from a consideration of the drawings and ensuing description.

DRAWING FIGURES

FIG. 1 prior art U.S. Pat. No. 5,684,637 (Floyd, 1997).

FIG. 2 prior art U.S. Pat. No. 4,890,903 (Treisman et al, 1990).

FIG. 3 prior art U.S. Pat. No. 5,166,831 (Hart, 1992).

FIG. 4 prior art U.S. Pat. No. 5,774,273 (Bornhorst, 1998).

FIG. 5 prior art U.S. Pat. No. 5,774,273 (Bornhorst, 1998).

FIG. 6 prior art U.S. Pat. No. 5,774,273 (Bornhorst, 1998).

FIG. 7 optical membrane.

FIG. 8 three membranes welded.

FIG. 9 cross section of three membranes welded.

FIG. 10 chamber ports through membrane.

FIG. 11 assembled, two valve unit.

FIG. 12 light refraction through multiple zoned cross section.

FIG. 13 multi-valve unit semi assembled.

FIG. 14 holes through membrane for multi-valve unit.

FIG. 15 multi-valve unit fully assembled.

FIG. 16 ray trace through multi-valve unit.

FIG. 17 actuation means.

FIG. 18 additional hardware.

FIG. 19 non-parallel surfaces.

FIG. 20 Fresnel variable mirror

REFERENCE NUMERALS IN DRAWINGS 31 membrane peak
33 prismatic zone
35 membrane valley
36 vertical wall
37 first welded membrane
39 welded optical membrane
41 second welded membrane
43 circular weld at membrane peak
45 vertical wall
47 circular chamber
49 first membrane wall
51 first optical membrane wall
53 opposite circular chamber
55 second membrane wall
57 second vertical wall
67 first weld
69 second weld
71 port into circular chamber
73 first rigid member
75 second rigid member
77 optical membrane installed
79 membrane piercing fluid channel 81 rigid member piercing fluid channel
83 incident light ray
84 first fluid
85 optical membrane cross section
86 second fluid
87 variable angle
89 resultant light ray
91 elastic wall
95 welded membrane assembly
99 first channeled member
101 second channeled member
103 first channel
107 second channel
111 membrane pierced for multi-valves
113 membrane port
114 laminated channeled member
116 additional rigid member
118 connection tube
119 first fluid connection tube
121 second fluid connection tube
123 second incident ray
125 chamber with first fluid
127 first optical membrane curved zone
129 chamber with second fluid
131 second optical membrane curved zone
133 refracted ray
135 second refracted ray
137 third incident ray
139 focal length
141 first set of cylinder hardware
143 cylinder
145 second set of cylinder hardware
147 first actuated rigid member
149 second actuated rigid member
151 actuated optical void
153 first injection tube
155 first distributor
157 first distributor tube
159 first pump tube
161 first pump
163 first reservoir
165 second distributor
167 second pump
169 second reservoir
171 first non parallel member
173 angular void
175 second non-parallel member
177 incoming ray
179 rigid transparent member
181 positive pressure gas in concentric chamber
183 negative pressure gas in concentric chamber
185 reflective membrane
187 resultant reflected ray

Operation of the Invention

Figure 1:
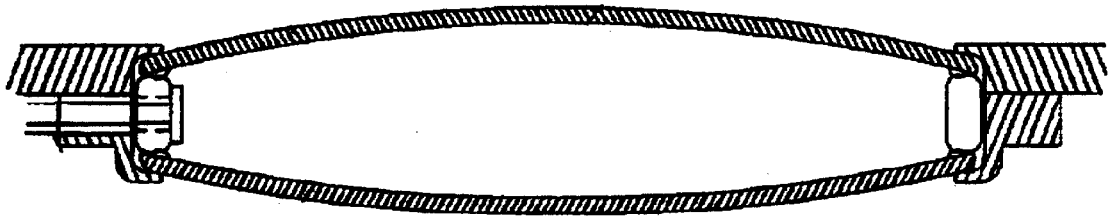
Figure 2:
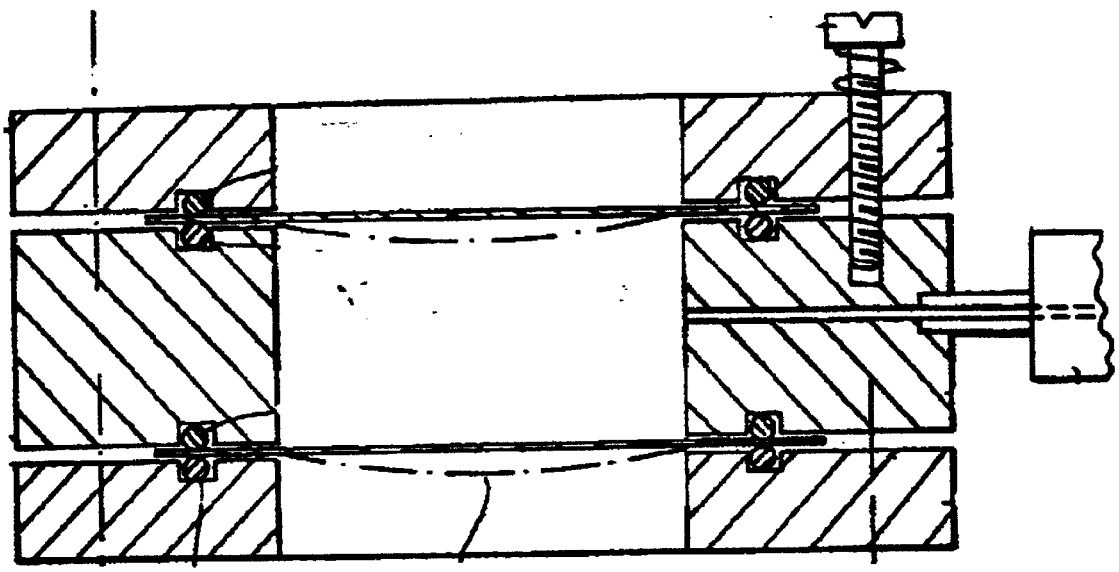
Figure 3:
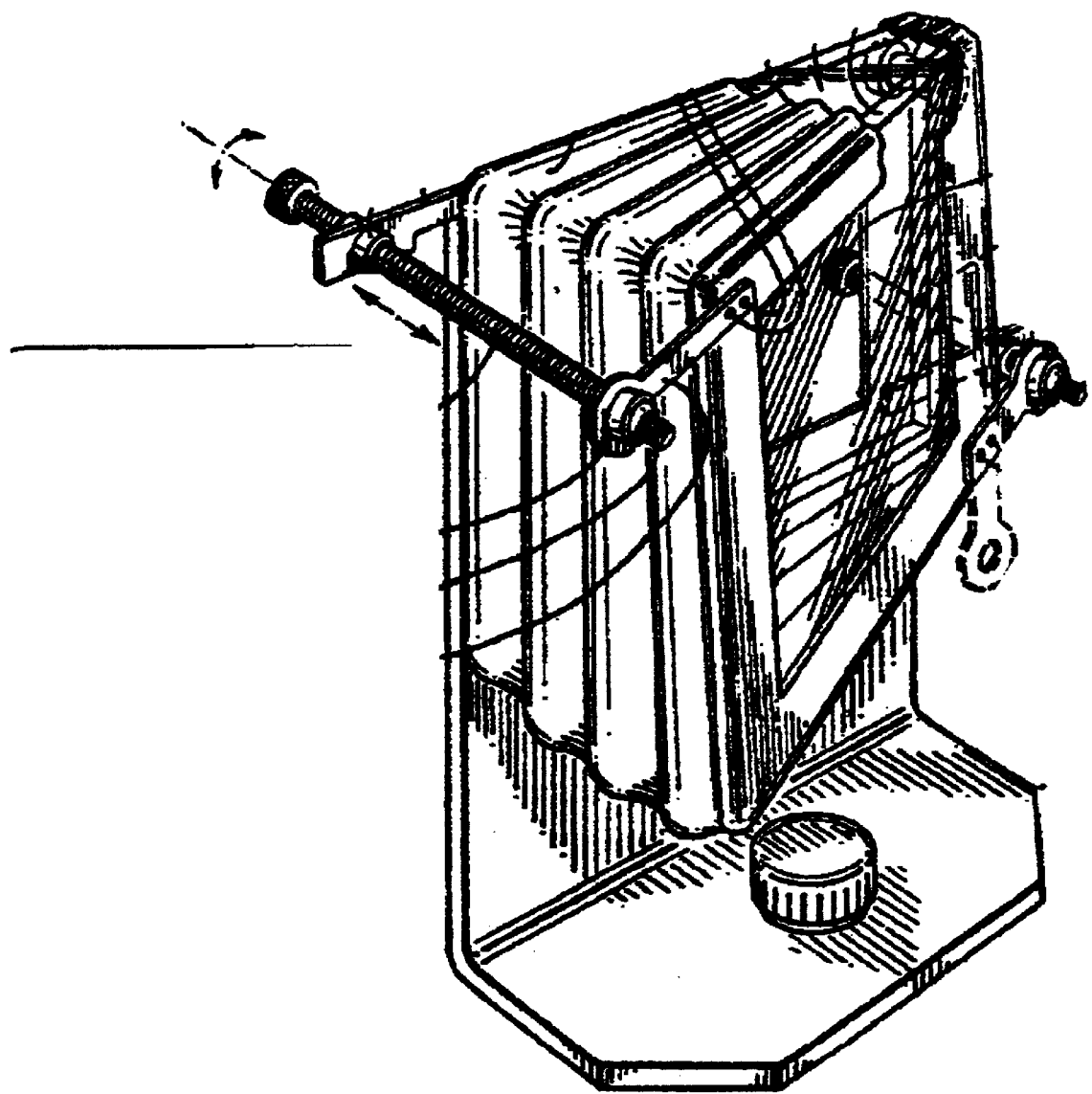
Figure 4:
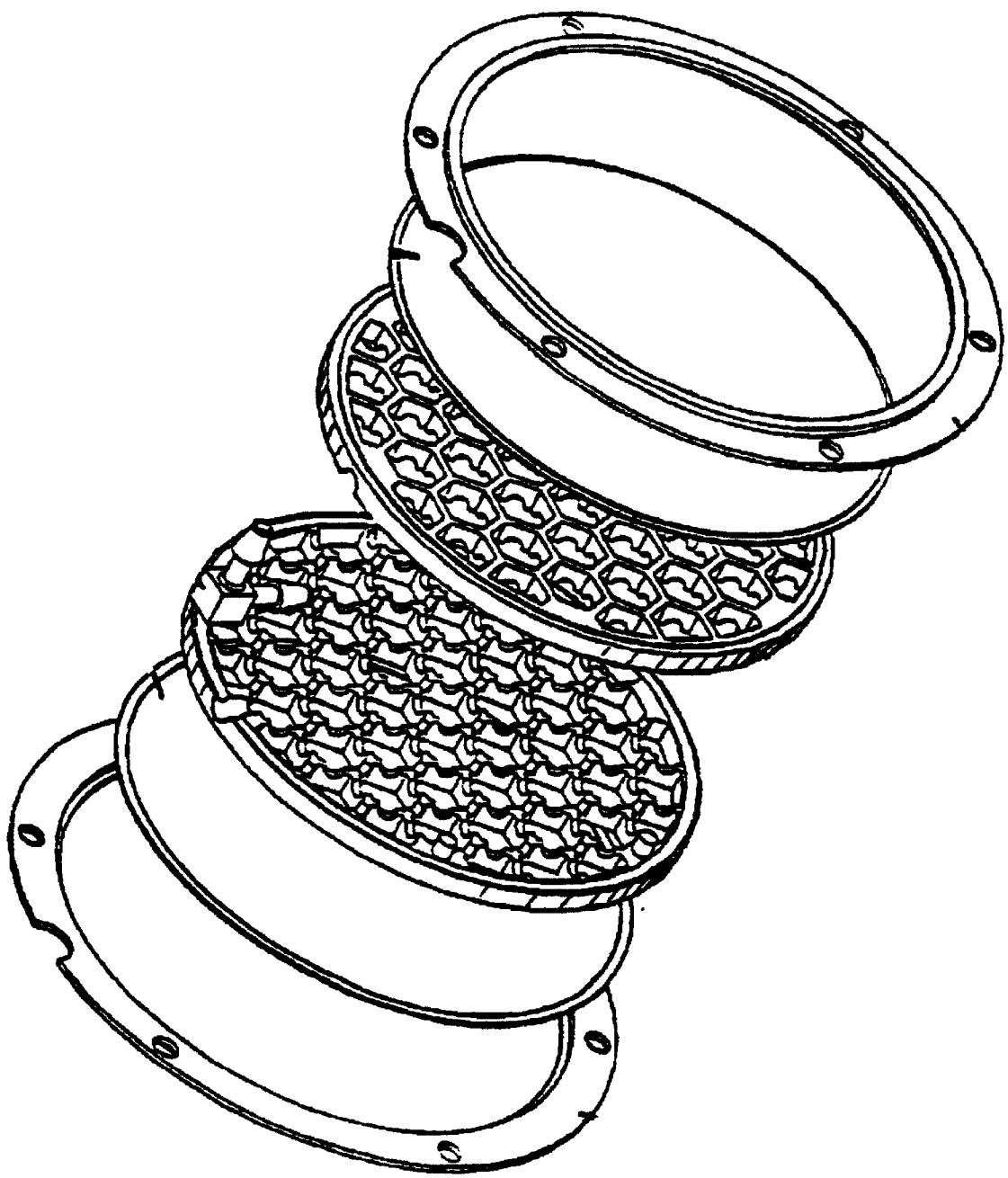
Figure 5:
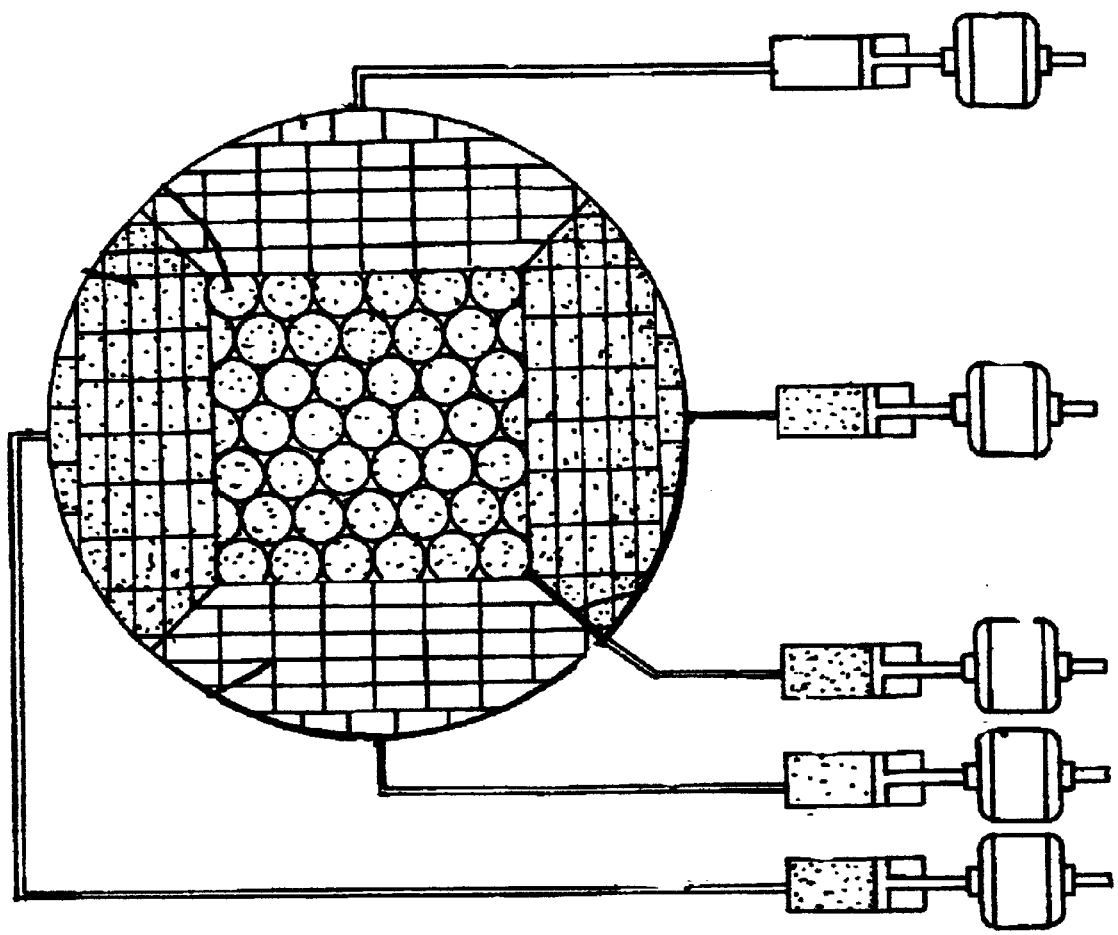
Figure 6:
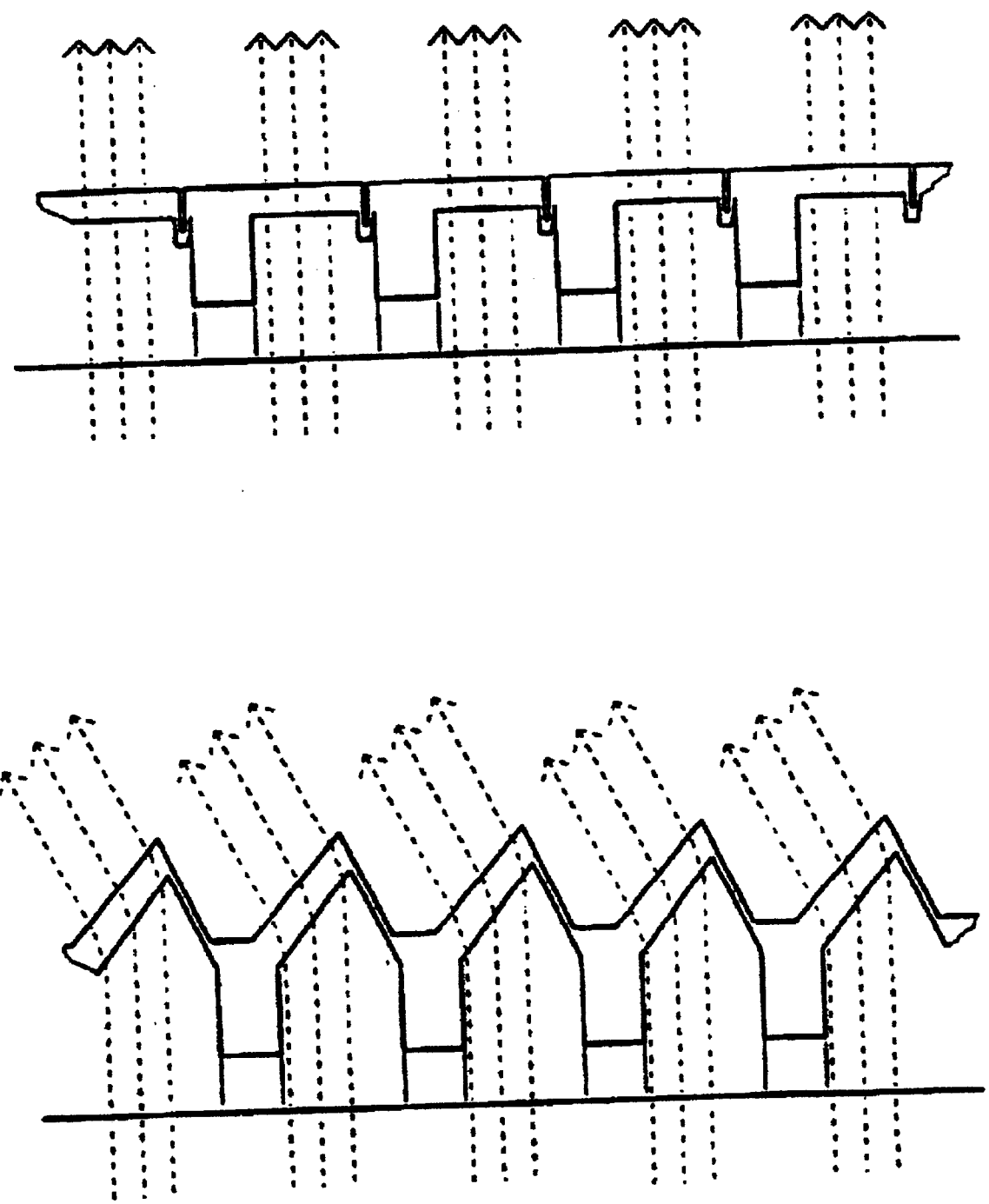
Figure 7:
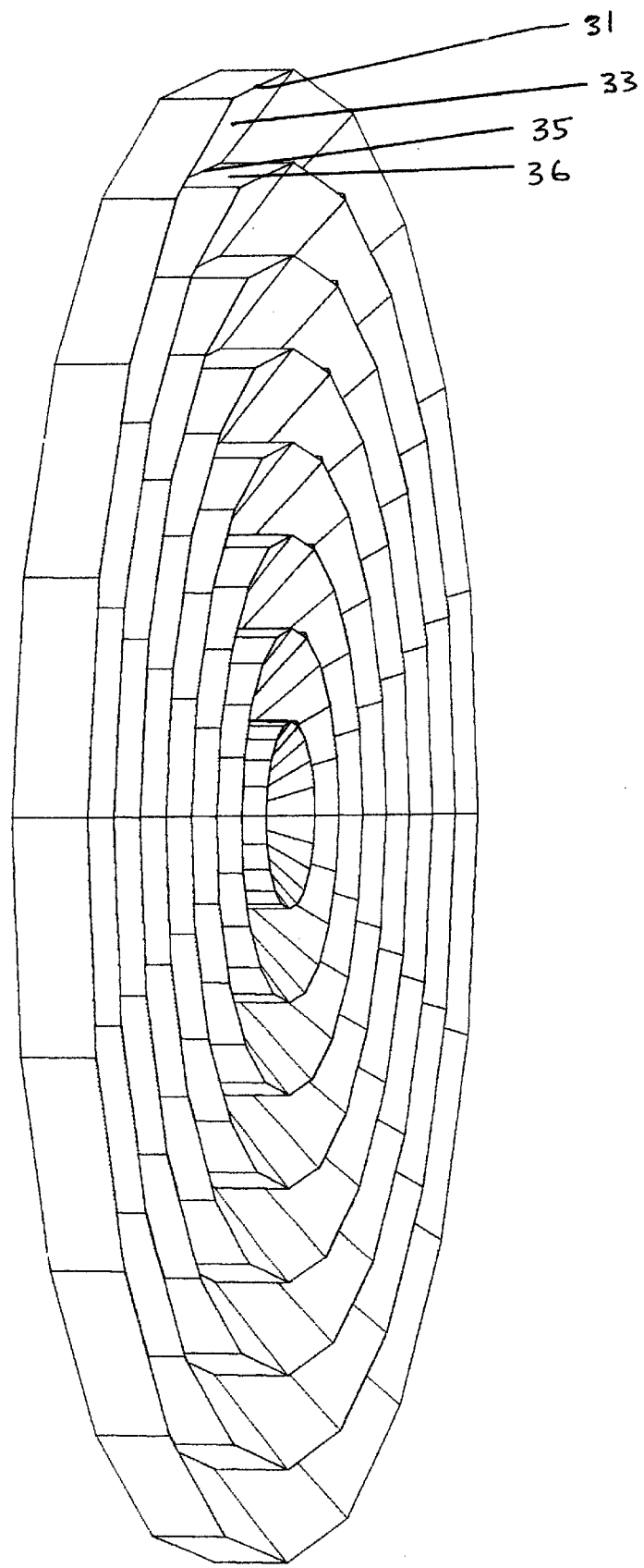
FIG. 7 depicts an optical membrane. The membrane is comprised of a 6 mil thick transparent material with high elasticity and memory. Polyurethane is a preferred material for this membrane. It can be either extruded and then molded to shape or it can be molded directly into shape. The membrane shape includes a series of peaks similar to a membrane peak 31. A prismatic zone 33 connects the membrane peak to a membrane valley 35. A vertical wall 36 then runs from the membrane valley to the next membrane peak. This pattern is repeated a number of times to form the entire optical membrane. The reverse (non-visible) side of the optical membrane has the exact same features except in inverse.

FIG. 7 depicts an optical membrane. The membrane is comprised of a 6 mil thick transparent material with high elasticity and memory. When actuated as later described, its walls can stretch or shrink to form desired prism angles and lens curvatures in the form of Fresnel zones. Polyurethane is a preferred material for this membrane. It can be either extruded and then molded to shape or it can be molded directly into shape. The membrane shape includes a series of peaks similar to a membrane peak 31. A prismatic zone 33 connects the membrane peak to a membrane valley 35. A vertical wall 36 then runs from the membrane valley to the next membrane peak. This pattern is repeated a number of times to form the entire optical membrane. The reverse (non-visible) side of the optical membrane has the exact same features except in inverse. As later discussed desirable optical properties are achieved when a first fluid with a refractive index is on one side of the membrane and a second fluid having a second refractive index is on the second side of the membrane. When the shape of the membrane is changed, the refracting surfaces of the fluids too is changed.

Figure 8:
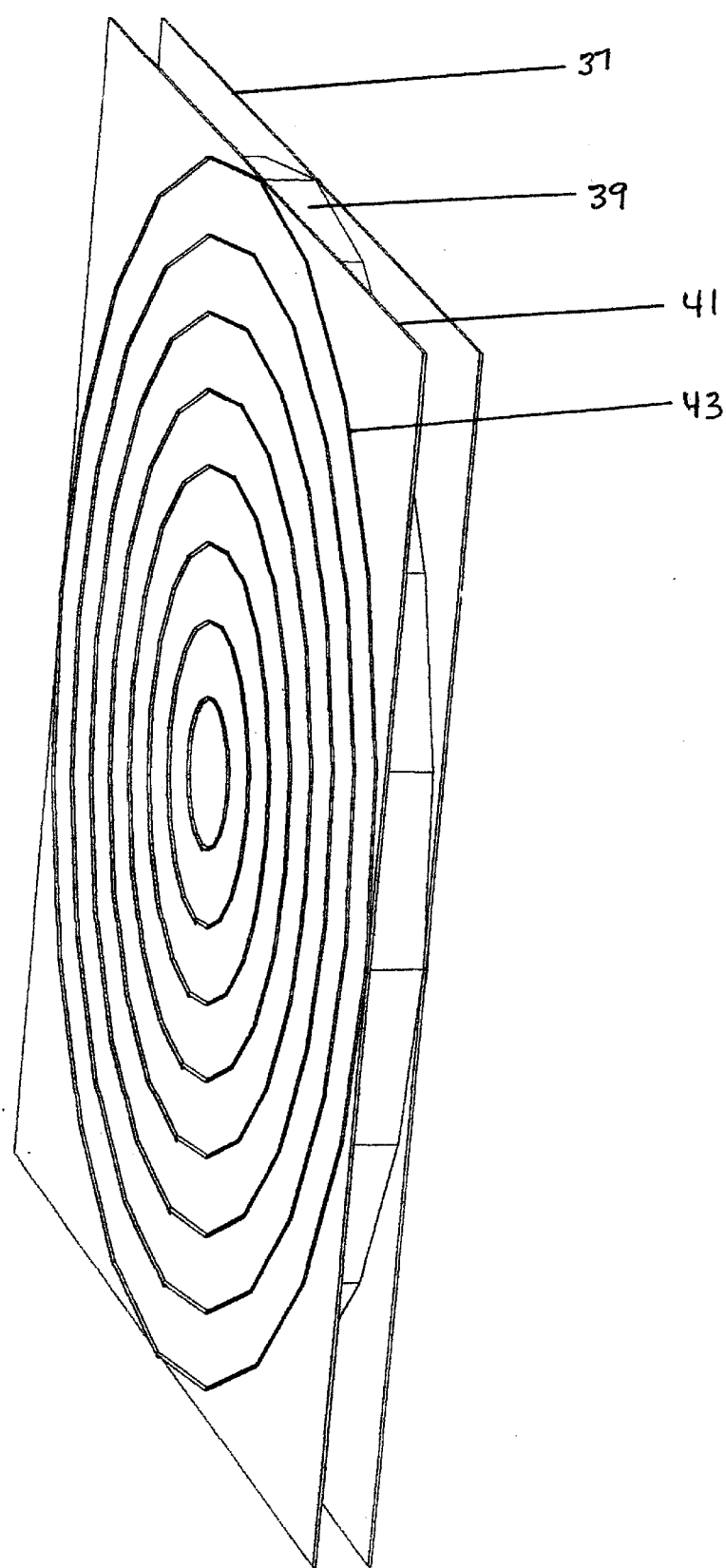
FIG. 8 depicts three membranes welded together. A first welded membrane 37 is a flat extruded sheet of polyurethane 6 mils thick. It is transparent and flexible. The valleys of a welded optical membrane 39 are heat sealed to the first welded membrane. A second welded membrane 41 is a flat extruded sheet of polyurethane 6 mils thick. The peaks of the welded optical membrane 39 are heat sealed to the second welded membrane 41. The process of heat sealing these three components commences at the center and progresses outward. A valley is sealed to the first welded membrane then a peak is sealed to the second welded membrane then a valley is sealed to the first welded membrane. Note that progressing in this alternating manner, all valleys are welded to the first welded membrane and all peaks are welded to the second welded membrane. A circular weld at membrane peak 43 is shown. It and the other shown concentric circles are the heat sealed welds of all of the peaks of the welded optical membrane and the second welded membrane. Each of the aforementioned circular heat sealed welds forms a sealed compartment describing a circle.

FIG. 8 depicts three membranes welded together. A first welded membrane 37 is a flat extruded sheet of polyurethane 6 mils thick. It is transparent and flexible. The valleys of a welded optical membrane 39 are heat sealed to the first welded membrane. A second welded membrane 41 is a flat extruded sheet of polyurethane 6 mils thick. The peaks of the welded optical membrane 39 are heat sealed to the second welded membrane 41. The process of heat sealing these three components commences at the center and progresses outward. A valley is sealed to the first welded membrane then a peak is sealed to the second welded membrane then a valley is sealed to the first welded membrane. Note that progressing in this alternating manner, all valleys are welded to the first welded membrane and all peaks are welded to the second welded membrane. A circular weld at membrane peak 43 is shown. It and the other shown concentric circles are the heat sealed welds of all of the peaks of the welded optical membrane and the second welded membrane. Each of the aforementioned circular heat sealed welds forms a sealed compartment describing a circle. Each of these circular compartments on one side of the welded optical membrane will be filled with a first fluid and each of the circular compartments on the other side of the optical membrane will be filled with a second fluid.

Figure 9:
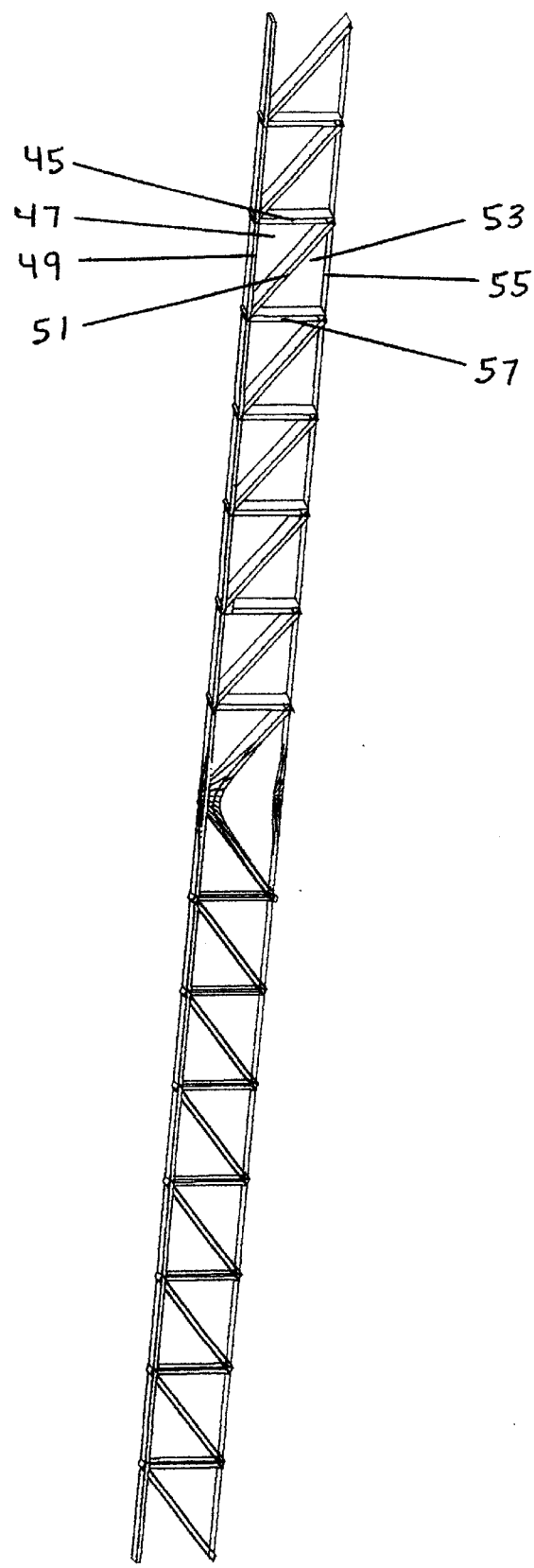
FIG. 9 illustrates a cross section of three membranes welded. This is a slice taken from the center of the three welded membranes of FIG. 8. A vertical wall 45 is formed by the optical welded membrane. It is welded on each end. It forms one wall of the three sided circular chamber 47. A first member wall 49 forms a second side of the circular chamber. A first optical membrane wall 51 forms the third side of the circular chamber 47. A series of similarly constructed and shaped circular chambers are formed on this same side of the optical membrane. A opposite circular chamber 53 is similarly formed. It is sealable created between the first optical membrane wall 51, a second membrane wall 55 and a second vertical wall 57. A series of chambers are similarly formed on this same side of the optical membrane.

FIG. 9 illustrates a cross section of three membranes welded. This is a slice taken from the center of the three welded membranes of FIG. 8. A vertical wall 45 is formed by the optical welded membrane. It is welded on each end. It forms one wall of the three sided circular chamber 47. A first member wall 49 forms a second side of the circular chamber. A first optical membrane wall 51 forms the third side of the circular chamber 47. A series of similarly constructed and shaped circular chambers are formed on this same side of the optical membrane. A opposite circular chamber 53 is similarly formed. It is sealable created between the first optical membrane wall 51, a second membrane wall 55 and a second vertical wall 57. A series of chambers are similarly formed on this same side of the optical membrane. As the first membrane wall 49 is actuated apart from the second membrane wall 55, the vertical wall 45 and the second vertical wall 57 are stretched. This actuation can be achieved by either pumping more fluid into the circular chambers or by actuating rigid members apart (both are later discussed). Note that the angle at which the fluids reside relative to one another will also change due to the stretching of the first optical membrane wall 51.

Figure 10:
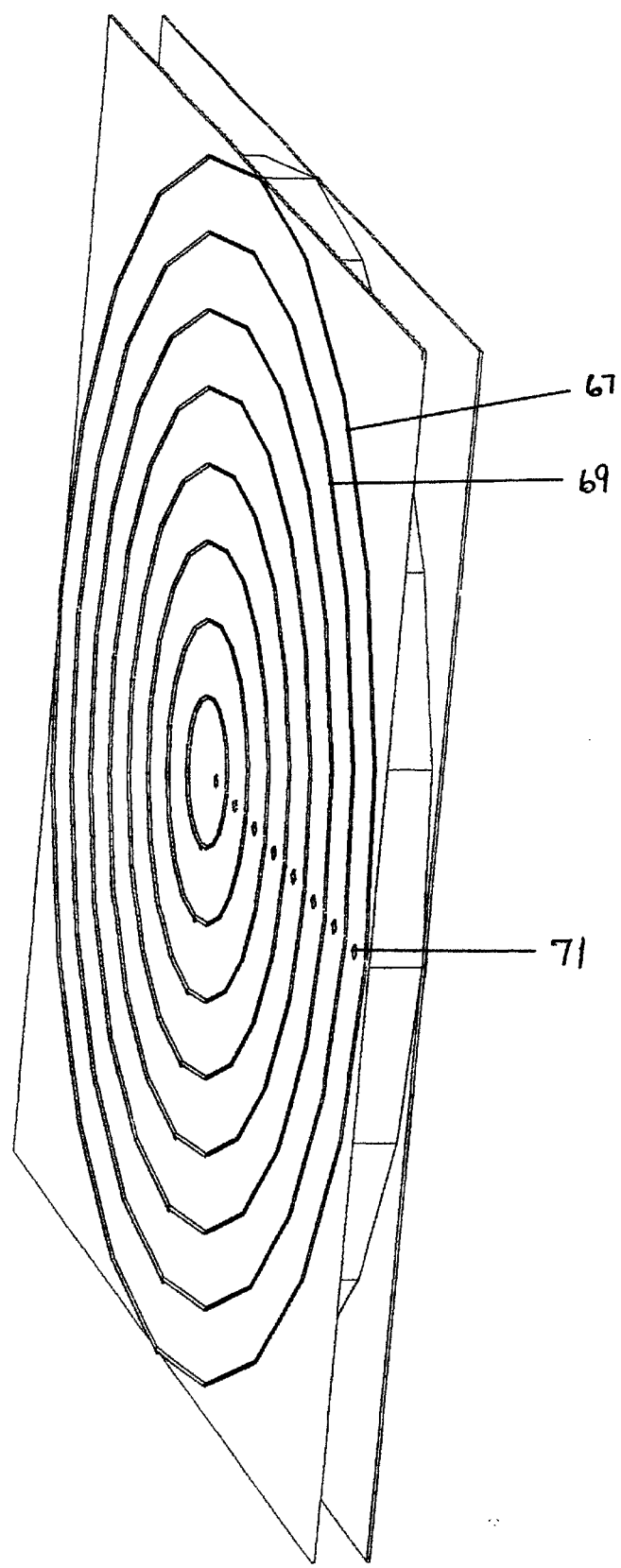
FIG. 10 depicts the welded membranes of FIG. 8 with chamber ports cut through a membrane. A port into circular chamber 71 represents the only means of communicating with the circular chamber housed between a first weld 67 and a second weld 69. As illustrated, each of the other chambers similarly has one respective port through which communication to the interior is possible.

FIG. 10 depicts the welded membranes of FIG. 8 with chamber ports cut through a membrane. A port into circular chamber 71 represents the only means of communicating with the circular chamber housed between a first weld 67 and a second weld 69. As illustrated, each of the other chambers similarly has one respective port through which communication to the interior is possible. Fluid is added or removed from the circular chambers through the ports that are similar to the port into circular chamber 71. A first fluid completely fills all of the compartments on one side of the optical membrane while a second fluid completely fills all of the compartments on the other side of the optical membrane.

Figure 11:
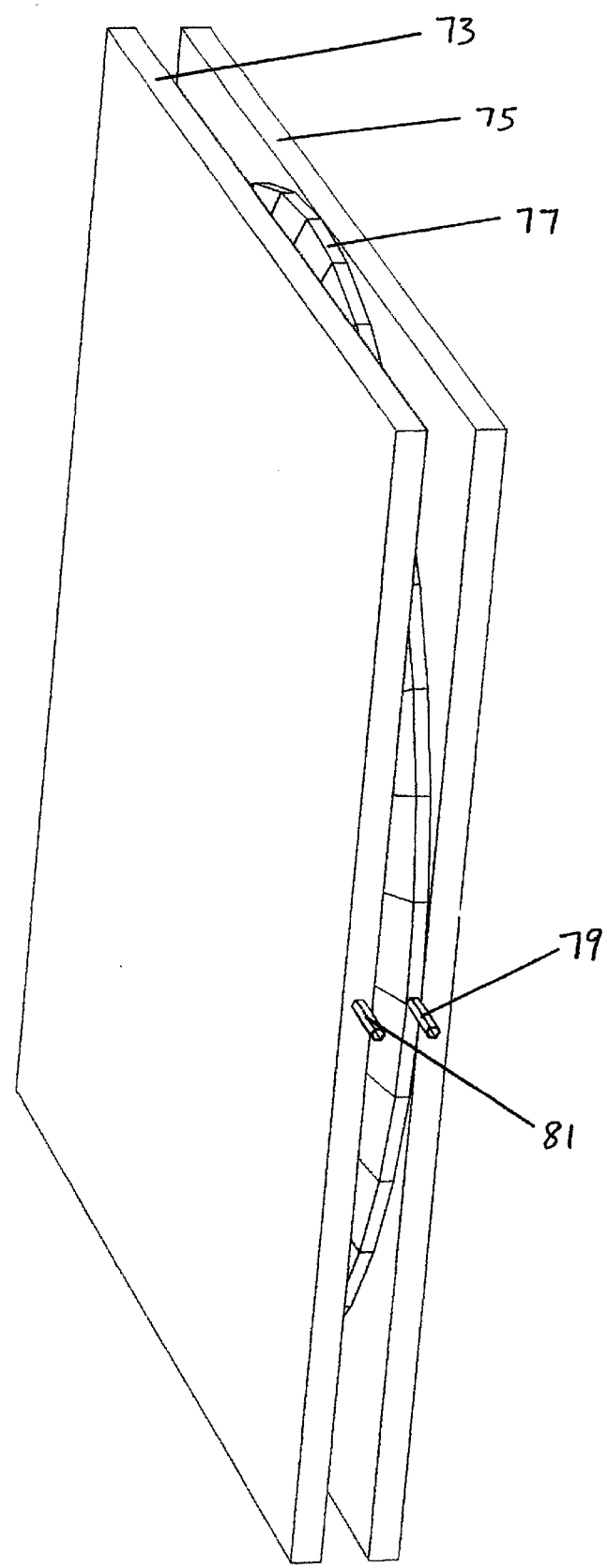
FIG. 11 shows an assembled, two valve unit. A first rigid member 73 has been glued to one side of the welded membrane assembly. The first rigid member is a piece of transparent glass and it is glued with a transparent glue to the welded membrane assembly. Similarly, a second rigid member 75 is glued to the other side of the welded membrane assembly. It too is a transparent piece of glass. The optical membrane installed 77 can be seen between the two rigid members. A membrane piercing channel 79 is protruding from the optical membrane. This is a flexible polyurethane tube which has sealable been welded in place such that it communicates with all of the circular chambers on one side of the optical membrane. It provides an alternate methodology to communicate with the chamber interiors. In this application it is used to communicate with one side of the optical membrane. An alternate means of communicating with the chamber interior is illustrated by a rigid member piercing fluid channel 81. The method of creating this means of communication is further discussed later. Each of the fluid channels include a protruding male end to enable a female supply hose (not shown) connection to occur.

FIG. 11 shows an assembled, two valve unit. A first rigid member 73 has been glued to one side of the welded membrane assembly. The first rigid member is a piece of transparent glass and it is glued with a transparent glue to the welded membrane assembly. Similarly, a second rigid member 75 is glued to the other side of the welded membrane assembly. It too is a transparent piece of glass. The optical membrane installed 77 can be seen between the two rigid members. A membrane piercing channel 79 is protruding from the optical membrane. This is a flexible polyurethane tube which has sealable been welded in place such that it communicates with all of the circular chambers on one side of the optical membrane. It provides an alternate methodology to communicate with the chamber interiors. In this application it is used to communicate with one side of the optical membrane. An alternate means of communicating with the chamber interior is illustrated by a rigid member piercing fluid channel 81. The method of creating this means of communication is further discussed later. Each of the fluid channels include a protruding male end to enable a female supply hose (not shown) connection to occur. Actuating the rigid members away from one another (as later discussed) causes more fluid to enter each of the circular chambers and causes the prismatic zones to form steeper prism angles. Actuating the rigid members together causes fluid to exit the circular chambers and causes the prismatic zones to form shallower angles. Actuating the rigid members completely together will cause all of the fluid to exit the circular chambers and the prismatic zones to be parallel with the rigid members. In this configuration, a ray normal to the rigid members will pass straight through the optical membrane structure with being redirected.

Figure 12:
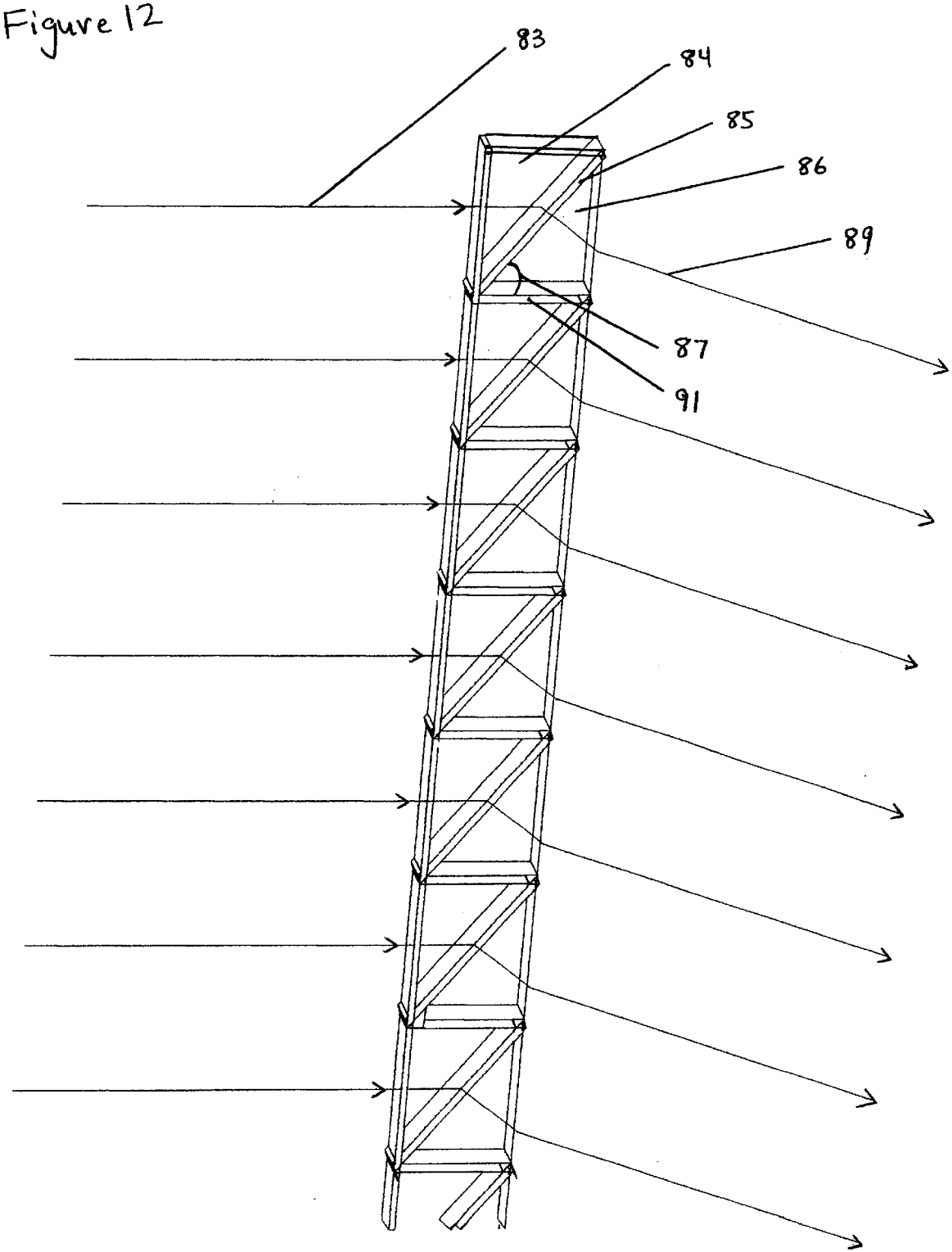
FIG. 12 illustrates light refraction through a multiple zoned cross-section. A incident light ray 83 passes through a first fluid with a first refractive index. In this illustration, the first refractive fluid has a refractive index near 1.00. The light ray then passes through an optical membrane cross section 85. The optical member cross section creates the separation of the first fluid from a second fluid 86. The optical member cross section also defines the angle at which light traveling though the unit will leave the first fluid and enter the second fluid. In this illustration, the second fluid has an index of refraction great than that of the first fluid. The light ray is therefor refracted in accordance with Snell's law. A resultant light ray 89 is accordingly bent to a new trajectory. Note that other rays entering the system on similar trajectories are also similarly refracted. A variable angle 87 is described between the optical membrane and the elastic wall 91.

FIG. 12 illustrates light refraction through a multiple zoned cross-section. A incident light ray 83 passes through a first fluid with a first refractive index. In this illustration, the first refractive fluid has a refractive index near 1.00 . The light ray then passes through an optical membrane cross section 85. The optical member cross section creates the separation of the first fluid from a second fluid 86. The optical member cross section also defines the angle at which light traveling though the unit will leave the first fluid and enter the second fluid. In this illustration, the second fluid has an index of refraction great than that of the first fluid. The light ray is therefor refracted in accordance with Snell's law. A resultant light ray 89 is accordingly bent to a new trajectory. Note that other rays entering the system on similar trajectories are also similarly refracted. A variable angle 87 is described between the optical membrane and the elastic wall 91. The variable angle can be used as an indicator of the steepness of the prismatic zone. The greater this angle, the shallower the prismatic zone (when the system is fully compressed, this angle will reach nearly ninety degrees and the elastic wall 91 will have a length of near zero. As the variable angle is decreased the optical membrane cross section 85 will stretch to from a prismatic zone with greater refraction.

Figure 13:
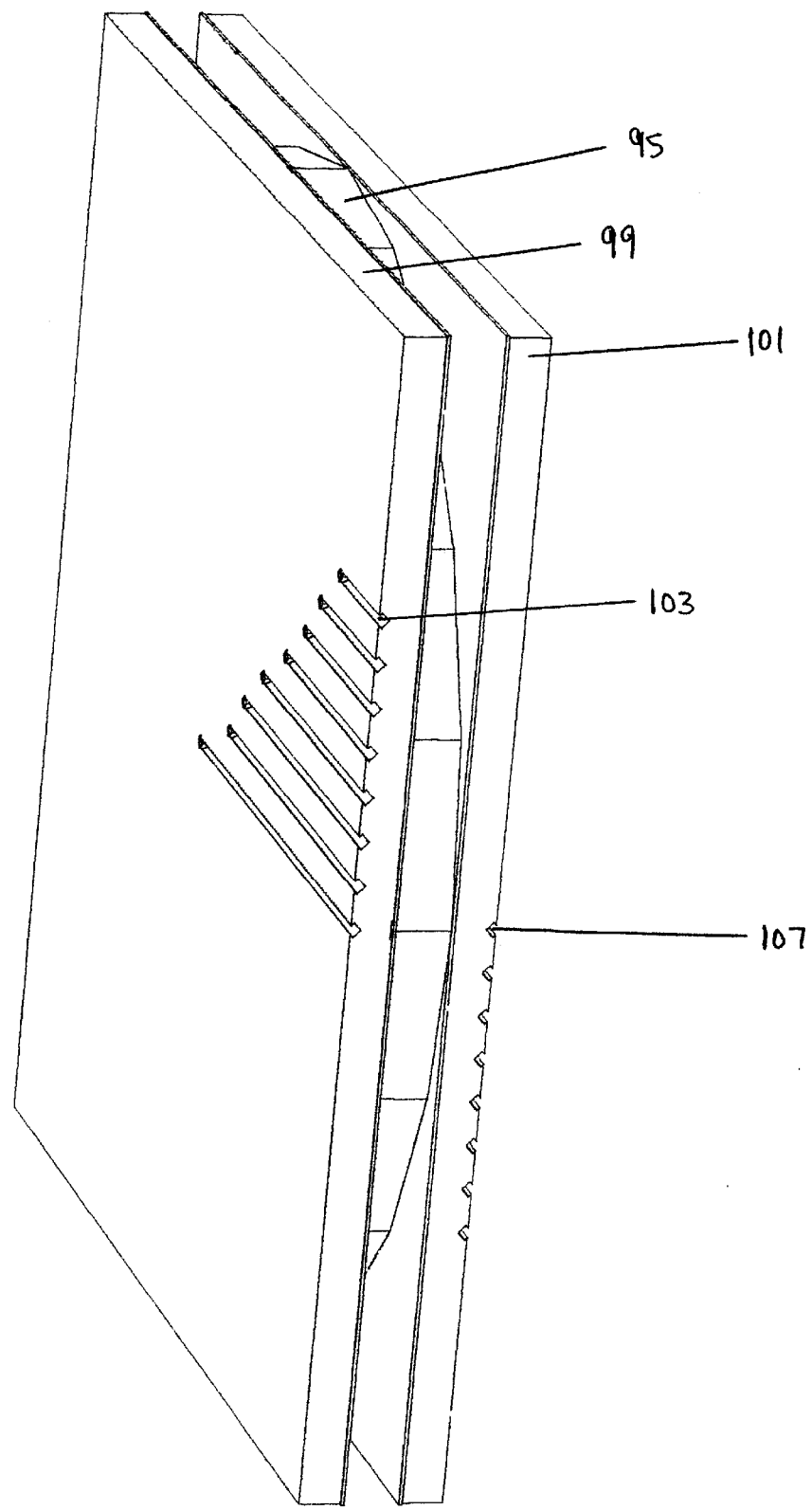
FIG. 13 illustrates a multi-valve unit semi-assembled. All of the components are identical to those previously discussed with one exception. The previous unit had one supply channel for each of the two refractive fluids, such that one channel connected all of the chambers on one side and a second channel connected all of the chambers on the second side. This two channel system enabled delivery of one fluid to one side at a first pressure and the second fluid to the second side at a second pressure. The provided the means to create a pressure differential between the two sets of concentric circular chambers. In contrast, the unit of FIG. 13 includes individual channels to communicate with each respective sealed chamber and thus the means to vary the pressure differential in each respective chamber. A welded membrane assembly 95 has been glued between a first channeled member 99 and a second channeled member 101. These channeled members are transparent glass with channels cut into one surface. Additionally, at the interior end of each channel a hole has been drilled through the first channeled member and the membrane glued thereto such that each hole communicates with one circular chamber as previously defined. A first channel 103 has been called out as one such channel of the first member and a second channel 107 has been called out as one of the series on the second member.

FIG. 13 illustrates a multi-valve unit semi-assembled. All of the components are identical to those previously discussed with one exception. The previous unit had one supply channel for each of the two refractive fluids, such that one channel connected all of the chambers on one side and a second channel connected all of the chambers on the second side. This two channel system enabled delivery of one fluid to one side at a first pressure and the second fluid to the second side at a second pressure. The provided the means to create a pressure differential between the two sets of concentric circular chambers. In contrast, the unit of FIG. 13 includes individual channels to communicate with each respective sealed chamber and thus the means to vary the pressure differential in each respective chamber. A welded membrane assembly 95 has been glued between a first channeled member 99 and a second channeled member 101. These channeled members are transparent glass with channels cut into one surface. Additionally, at the interior end of each channel a hole has been drilled through the first channeled member and the membrane glued thereto such that each hole communicates with one circular chamber as previously defined. A first channel 103 has been called out as one such channel of the first member and a second channel 107 has been called out as one of the series on the second member. Using a distributor as later discussed, the pressure of fluid in each compartment can be controlled such that optical membrane curvature can be varied for each section of the optical membrane. Thus a variable Fresnel lens is generated.

Figure 14:
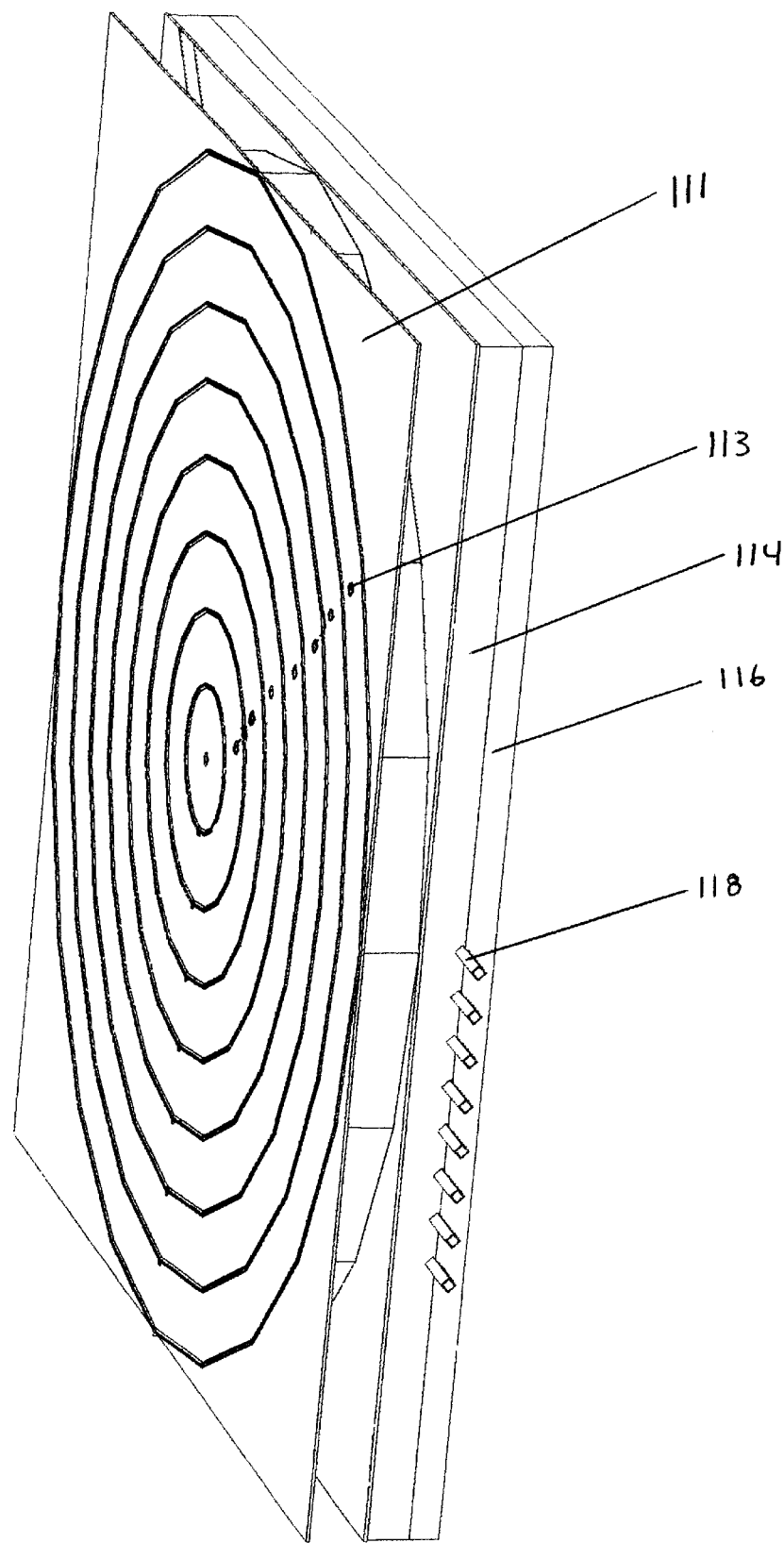
FIG. 14 illustrates holes through the membrane for multi-valve unit. This is the same structure as FIG. 13 with the first member removed to reveal the membrane pierced for multi-valves 111. The holes go through the one membrane such that each communicates with the interior of one circular channel. A Membrane port 113 is one such hole. On the other side of the membrane assembly, a laminated channeled member 114 has been glued to an additional rigid member 116. This additional rigid member is a transparent glass. It has been added to sealable form a wall for all of the channels that were previously described. A connection tube 118 provides a means to hook a female tube up to the assembly, through which communicating fluid to the respective circular channel is possible. The other channels have been similarly fitted with a male member.

FIG. 14 illustrates holes through the membrane for multi-valve unit. This is the same structure as FIG. 13 with the first member removed to reveal the membrane pierced for multi-valves 111. The holes go through the one membrane such that each communicates with the interior of one circular channel A membrane port 113 is one such hole. On the other side of the membrane assembly, a laminated channeled member 114 has been glued to an additional rigid member 116. This additional rigid member is a transparent glass. It has been added to sealable form a wall for all of the channels that were previously described. A connection tube 118 provides a means to hook a female tube up to the assembly, through which communicating fluid to the respective circular channel is possible. The other channels have been similarly fitted with a male member. The first fluid is selective pumped into all of the holes on one side of the unit in coordination with the pumping of the second fluid selectively into all of the holes on the other side of the unit.

Figure 15:
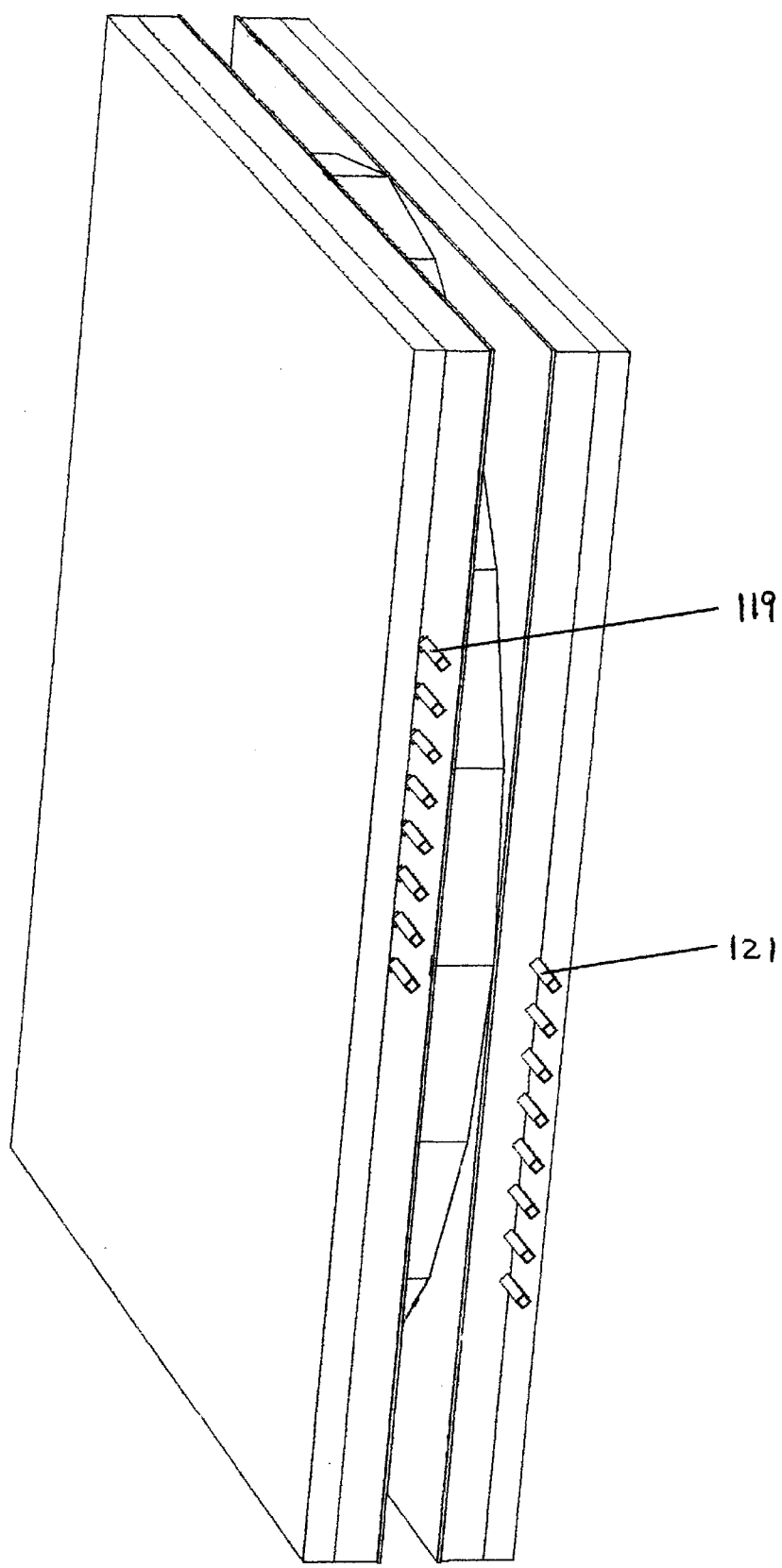
FIG. 15 depicts a multi-valve unit fully assembled. A first fluid connection tube 119 has been sealable inserted into one of the previously described channels. It enables communication with one circular chamber. Each of the other tubes likewise communicates with one circular chamber. A second fluid connection tube 121 has been called out as a representative of the tubes on the other side of the membrane structure.

FIG. 15 depicts a multi-valve unit fully assembled. A first fluid connection tube 119 has been sealable inserted into one of the previously described channels. It enables communication with one circular chamber. Each of the other tubes likewise communicates with one circular chamber. A second fluid connection tube 121 has been called out as a representative of the tubes on the other side of the membrane structure. The first fluid is selective pumped into all of the tubes on one side of the unit in coordination with the pumping of the second fluid selectively into all of the tubes on the other side of the unit.

Figure 16:
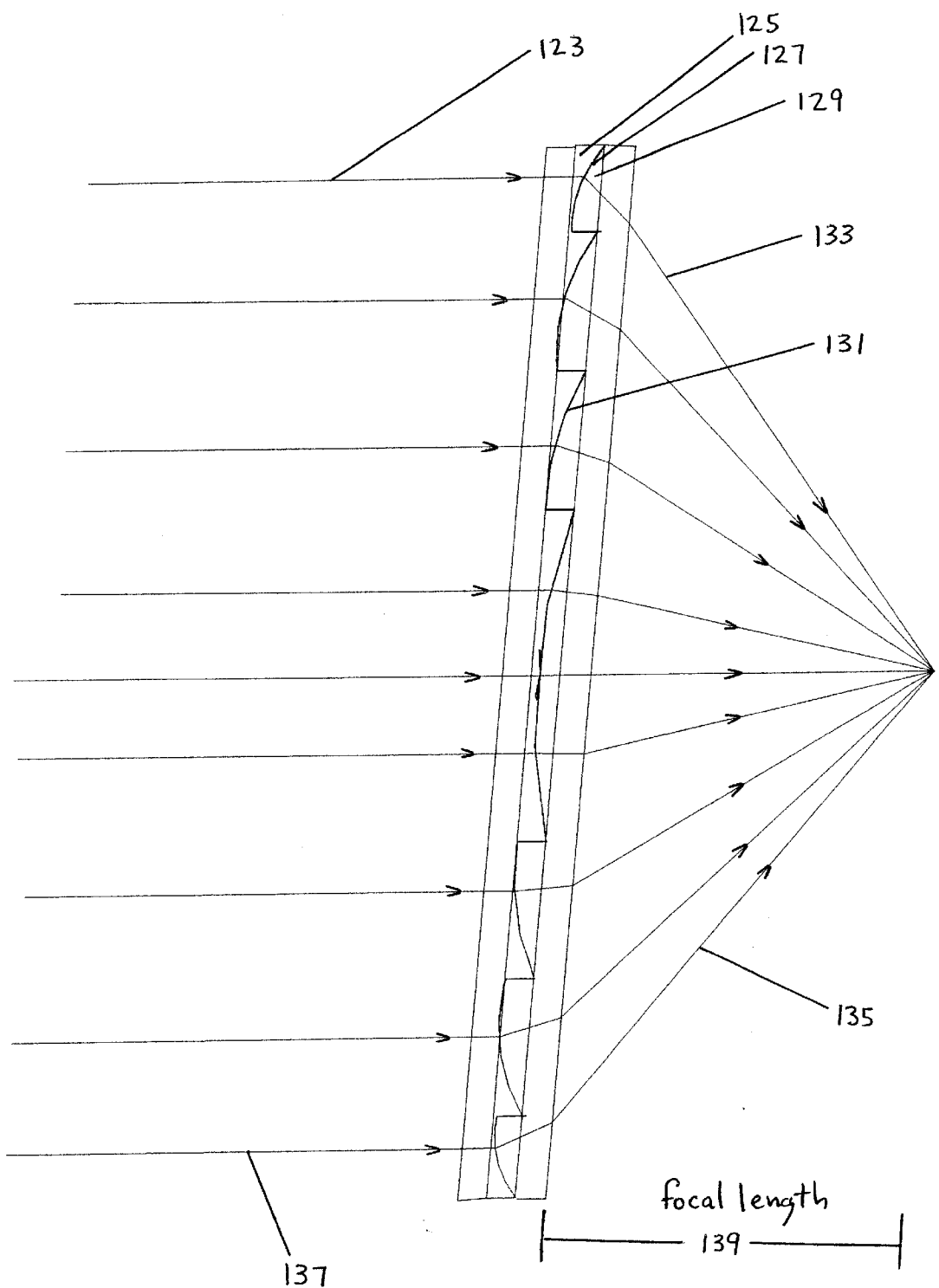
FIG. 16 illustrates ray tracing through the optical components of a multi-valve unit. A second incident ray 123 passes through a chamber with first fluid 125. This chamber contains a fluid with a first refractive index. In this illustration, the refractive index would be slightly greater than 1.00. The light ray is then incident upon a first optical membrane curved zone 127 whereupon it is bent according to Snell's law. It then enters the chamber with second fluid 129. Fluid in this chamber is assumed to have a refractive index high than that in the first chamber. The ray is refracted according to Snell's law into a new trajectory as a refracted ray 133. The curvature of the first optical membrane curved zone is caused by introducing a negative fluid pressure into the chamber with first fluid and a concomitant positive pressure in the chamber with second fluid. This pressure mismatch causes the first optical membrane curved zone to bend away from the chamber of high pressure into the chamber of low pressure. The curvature of each individual chamber wall is possible due to the fact that each circular chamber is individually supplied with fluid by its own port and channel as previously described. Accordingly a second optical membrane curved zone has a different curvature than does the first optical membrane curved zone. This is because the pressure differential on each side of the wall of the second optical membrane curved zone are different than the pressure on opposite sides of the first optical membrane curved zone. A third incident ray 137 is called out to illustrate that it will be refracted at the negative of the first example. This is because they are each responding to the mirror of the other's curvature. They are on the opposite sides of the optic center but they are actually the same circular chamber (180 degrees apart). A focal length 139 has been created by adjusting the pressures of each circular chamber such that a convergent lens is created. The focal length can be adjusted by a process of calculating the curve required in each chamber to achieve a desired focal length and then creating each of these curves through pressure differentials and actuating the rigid members closer together or further apart to control the optical membrane angle slope (the FIG. 12 variable angle 87) as needed.

FIG. 16 illustrates ray tracing through the optical components of a multi-valve unit. A second incident ray 123 passes through a chamber with first fluid 125. This chamber contains a fluid with a first refractive index. In this illustration, the refractive index would be slightly greater than 1.00. The light ray is then incident upon a first optical membrane curved zone 127 whereupon it is bent according to Snell's law. It then enters the chamber with second fluid 129. Fluid in this chamber is assumed to have a refractive index higher than that in the first chamber. The ray is refracted according to Snell's law into a new trajectory as a refracted ray 133. The curvature of the first optical membrane curved zone is caused by introducing a negative fluid pressure into the chamber with first fluid and a concomitant positive pressure in the chamber with second fluid. This pressure mismatch causes the first optical membrane curved zone to bend away from the chamber of high pressure into the chamber of low pressure. The curvature of each individual chamber wall is possible due to the fact that each circular chamber is individually supplied with fluid by its own port and channel as previously described. Accordingly a second optical membrane curved zone has a different curvature than does the first optical membrane curved zone. This is because the pressure differential on each side of the wall of the second optical membrane curved zone are different than the pressure on opposite sides of the first optical membrane curved zone. A third incident ray 137 is called out to illustrate that it will be refracted at the negative of the first example. This is because they are each responding to the mirror of the other's curvature. They are on the opposite sides of the optic center but they are actually the same circular chamber (180 degrees apart). A focal length 139 has been created by adjusting the pressures of each circular chamber such that a convergent lens is created. The focal length can be adjusted by a process of calculating the curve required in each chamber to achieve a desired focal length and then creating each of these curves through pressure differentials and actuating the rigid members closer together or further apart to control the optical membrane angle slope (the FIG. 12 variable angle 87) as needed. Actuating the two rigid members to which these membranes are connected (not shown) will cause the angles of the curved zones to be steeper.

Figure 17:
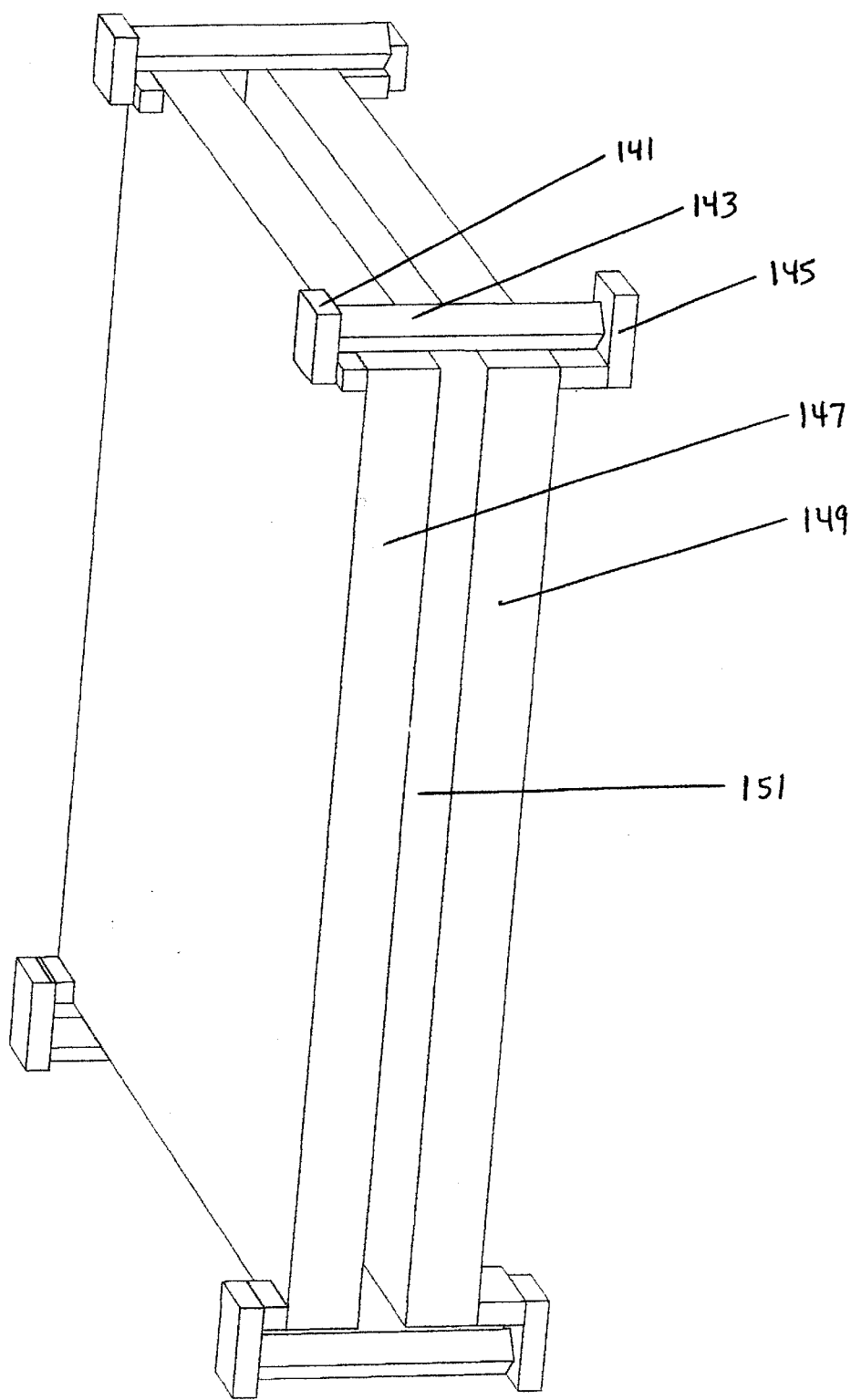
FIG. 17 illustrates additional system actuation means. A first actuated rigid member 147 represents the transparent glass that has been previously described. Similarly a second actuated rigid member is the same transparent glass previously described. A first set of cylinder hardware 141 and a second set of cylinder hardware 145 each connect one end of a cylinder 143 to a corner of the two rigid members. A actuated optical void 151 resides between the two rigid members. Note that this optical void can be increased and decreased by using the cylinder (or the others similar) to push the two rigid members apart. Likewise the void can be decreased by using the cylinder to pull the rigid members together. The cylinder is a pneumatic as other the others depicted.

FIG. 17 illustrates additional system actuation means. This actuation means has been mentioned previously. A first actuated rigid member 147 represents the transparent glass that has been previously described. Similarly a second actuated rigid member is the same transparent glass previously described. A first set of cylinder hardware 141 and a second set of cylinder hardware 145 each connect one end of a cylinder 143 to one of the corners of the two rigid members. A actuated optical void 151 resides between the two rigid members. Note that this optical void can be increased and decreased by using the cylinder (or the others similar) to push the two rigid members apart. Likewise the void can be decreased by using the cylinder to pull the rigid members together. The cylinder is a pneumatic as other the others depicted. As the rigid members are actuated apart, the variable angle of FIG. 87 is decreased and the prismatic zone becomes steeper. Using actuation in conjunction with increasing or decreasing fluid content in the fluid chambers enables one to control prism and lens angles.

Figure 18:
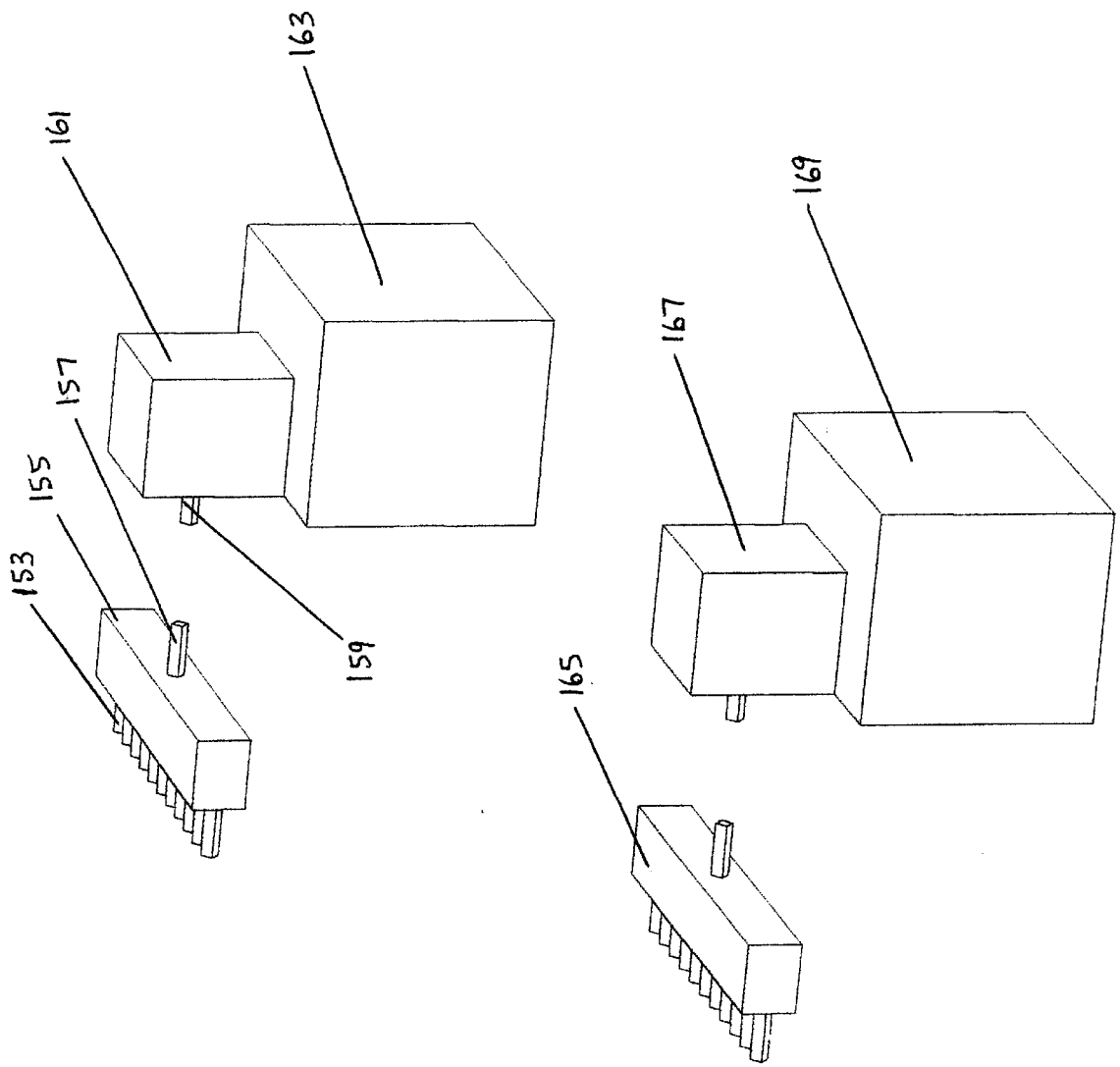
FIG. 18 additional hardware required. A first injection tube 153 is a male tube similar to those projecting from the multi-channel unit previously described. A hose (not shown) connects this injection tube to one of the tubes on the (FIG. 15) multi-channel unit. Each of the other tubes depicted here are similarly connected by hoses (not shown) to one of the tubes on one side of the (FIG. 15) multi-channel unit previously discussed. The first injection tube is connect to a first distributor 155. This distributor handles one of the two fluids previously discussed. It controls how much pressure is provided to each of the respective circular chambers and thus helps determine the curvature of each of the individual circular chambers. The first distributor has a first distributor tube 157 which receives positive or negative pressure from a first pump 161 via a first pump tube 159. Excess fluid of one type is kept in a first reservoir 163. Combined, these apparatus help determine the slope of the prism zones on the optical surfaces and the curvature of the lens zones on the optical surfaces. Similarly, controlling the second fluid's volume and pressure within the welded assembly are a second distributor 165, a second pump 167, and a second reservoir 169. It should be noted that on the two valve unit, a direct connection from the first pump to one side of the optical membrane and a second connection from the second pump to the other side of the optical membrane is possible (assuming a pressure regulator is built into the pump assembly). No distributor is needed to control pressure individually in each of the curved chambers.

FIG. 18 additional hardware required. A first injection tube 153 is a male tube similar to those projecting from the multi-channel unit previously described. A hose (not shown) connects this injection tube to one of the tubes on the (FIG. 15) multi-channel unit. Each of the other tubes depicted here are similarly connected by hoses (not shown) to one of the tubes on one side of the (FIG. 15) multi-channel unit previously discussed. The first injection tube is connect to a first distributor 155. This distributor handles one of the two fluids previously discussed. It controls how much pressure is provided to each of the respective circular chambers and thus helps determine the curvature of each of the individual circular chambers. The first distributor has a first distributor tube 157 which receives positive or negative pressure from a first pump 161 via a first pump tube 159. Excess fluid of one type is kept in a first reservoir 163. Combined, these apparatus help determine the slope of the prism zones on the optical surfaces and the curvature of the lens zones on the optical surfaces. Similarly, controlling the second fluid's volume and pressure within the welded assembly are a second distributor 165, a second pump 167, and a second reservoir 169. Within the distributor is a valve that opens or closes fluid flow to each of the injection tubes. Using this system, the valve to one injection tube at a time can be opened for creating different curvatures on each optical zone or the valves to all of the tubes can be opened to create identical curves on each of the optical zones (or flat prismatic zones). Also within the each of the distributors is a flow monitor that monitors the flow from the distributor tubes. This enables monitoring of the fluid quantity flowing through each respective injection tube. The distributor valves are turned off and on by computer. The flow monitor is monitored by a computer. Computer monitoring, processing, memory, and control will be further discussed later.

It should be noted that on the two valve unit, a direct connection from the first pump to one side of the optical membrane and a second connection from the second pump to the other side of the optical membrane is possible (assuming a pressure regulator is built into the pump assembly). No distributor is needed to control pressure individually in each of the curved chambers.

Figure 19:
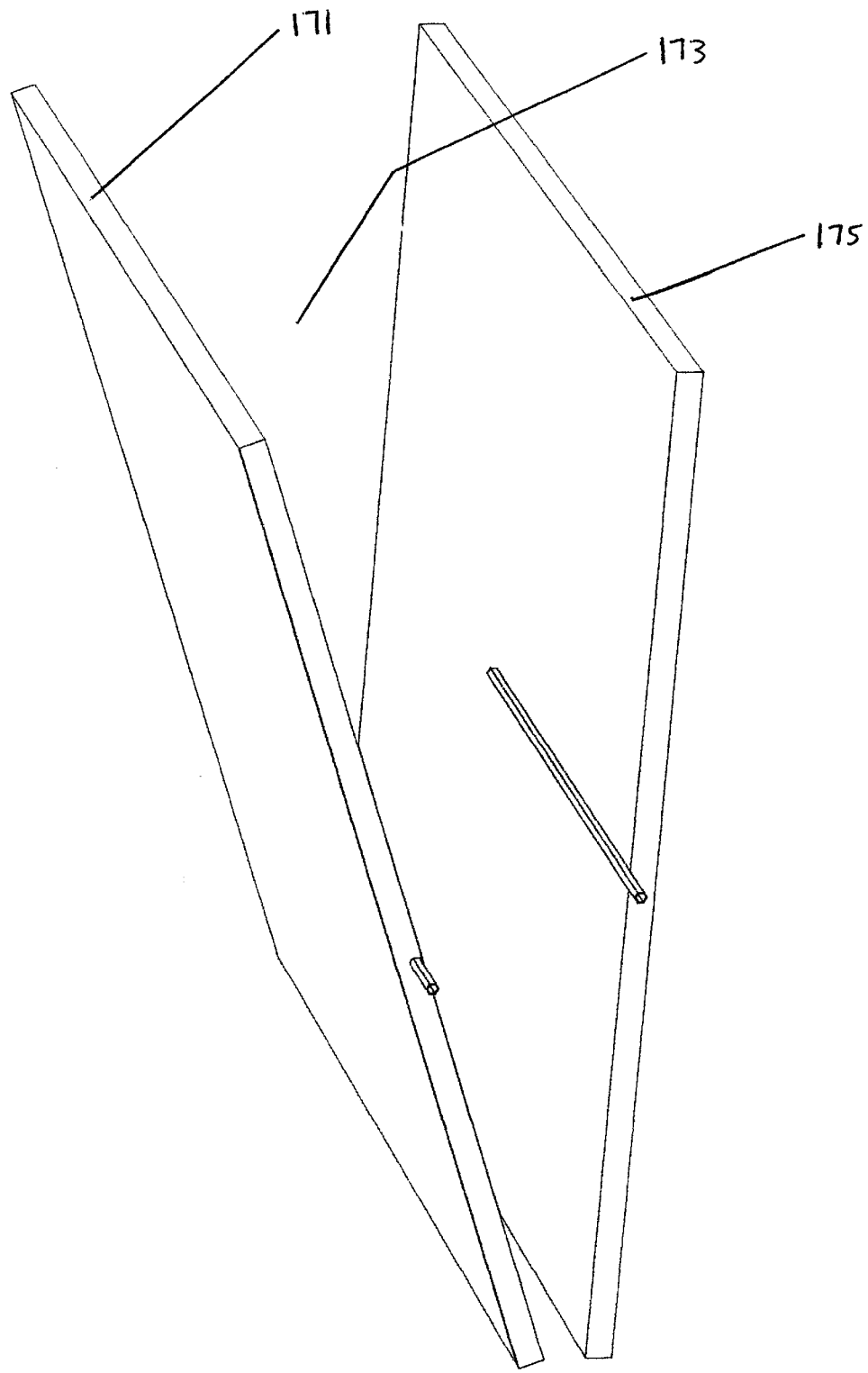
FIG. 19 depicts non-parallel surfaces. Heretofore all of the examples herein described rigid members that were largely actuated such that they remained parallel. Using the cylinders of FIG. 17, the rigid members can be actuated into non-parallel planes. A 171 first non-parallel member is actuated away from a second non-parallel member. This configuration creates desirable ray directing effects within the welded membranes (not shown) normally residing within the angular void 173.

FIG. 19 depicts non-parallel surfaces. Heretofore all of the examples herein described rigid members that were largely actuated such that they remained parallel. Using the cylinders of FIG. 17, the rigid members can be actuated into non-parallel planes. A 171 first non-parallel member is actuated away from a second non-parallel member. This configuration creates desirable ray directing effects within the welded membranes (not shown) normally residing within the angular void 173.

Figure 20:
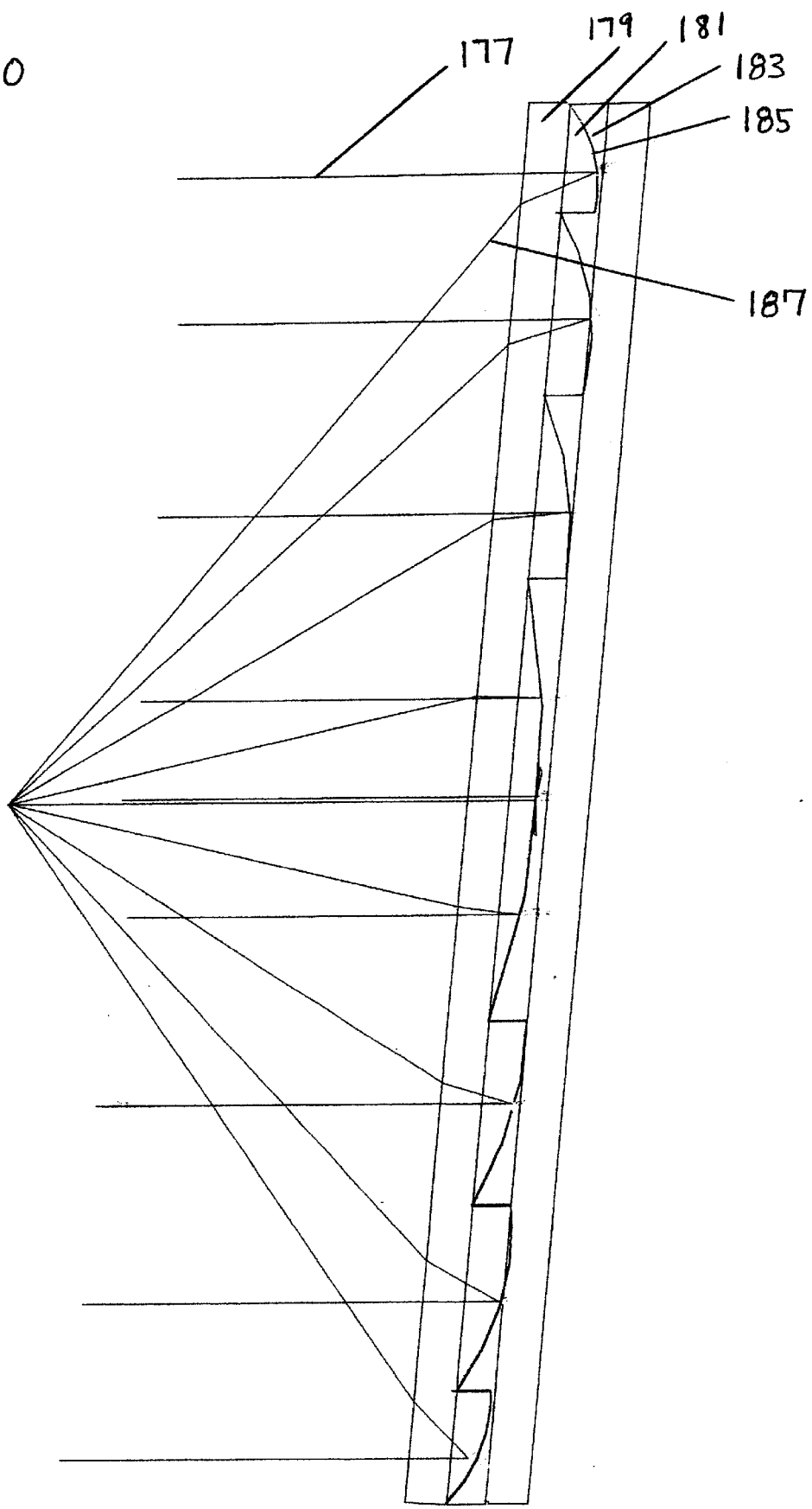
FIG. 20 depicts a Fresnel variable mirror. An incoming ray 177 passes through a rigid transparent member 179. The rigid transparent member forms one side of a positive pressure gas in concentric chamber 181. This positive pressure is on one side of a reflective membrane 185. This together with the negative pressure gas in concentric chamber 183 on the opposite side of the reflective membrane causes the membrane to bend into a Fresnel zone focusing mirror. A resultant reflected ray 187 joins the other rays at a focus point. The focal length is variable by varying the distance of the two rigid members from one another and varying the pressure of either side of the membrane. Each concentric chamber's pressure can be independently controlled.

FIG. 20 depicts a Fresnel variable mirror. An incoming ray 177 passes through a rigid transparent member 179. The rigid transparent member forms one side of a positive pressure gas in concentric chamber 181. This positive pressure is on one side of a reflective membrane 185. This together with the negative pressure gas in concentric chamber 183 on the opposite side of the reflective membrane causes the membrane to bend into a Fresnel zone focusing mirror. A resultant reflected ray 187 joins the other rays at a focus point. The focal length is variable by varying the distance of the two rigid members from one another and varying the pressure of either side of the membrane. Each concentric chamber's pressure can be independently controlled.

Computer control of the optical surfaces is not needed when using a two tube model where the optical membrane curvature is not to vary from chamber to chamber. A flat prismatic surface can be created by introducing the same pressures of fluid into each side of the membrane. Curved surfaces can be created in the two tube model by simply applying more pressure on one side than the other (and holding the actuating cylinders in a stable position). This does not require a computer either. Control for the two tube model can thus be achieved by a user controlling precision reversible pumps to supply the two fluids and to power the actuation cylinders.

Computer control is required for making more complex surfaces where each concentric zone of the optical membrane is curved differently (as with the multi-channel unit). Calculation must be made as to what curvature is required on each optical zone to create a correct Fresnel lens with desired characteristics. Once this is calculated, the quantity of liquid required in each chamber must be calculated. Then, this quantity of fluid must be added (or subtracted) to the fluid already in each chamber (a quantity that must be stored in memory). This addition or subtraction of fluid must be precisely monitored and controlled by computer. The computer must also calculate the positions that each of the actuation cylinders should be in and move them to the required position. This paragraph represents a brief flow-chart of the computer process required.

Advantages

The advantages of utilizing variable Fresnel type structures as described herein are manifold. One structure can function as a variable focusing prism. The same structure can function as a variable lens with varying focal length Thus, one optical structure can be manipulated to change its optical properties quickly and reliably and as frequently as required. In the mirror application, light weight, thin, variable reflective optics can reliable produce a range of focal lengths. Clearly the objects of illumination, entertainment, communications, science, photography, telescopy, medicine, and magnification (among many others) will all benefit from this new technology.

Conclusion, Ramifications, and Scope

Thus the reader will see that the variable Fresnel type structures and process of this invention provides a highly functional and reliable means to alter how electromagnetic energy is directed by an optical structure. The applications of this new structure and process are too numerous to list herein.

While my above description describes many specifications, these should not be construed as limitations on the scope of the invention, but rather as an exemplification of one preferred embodiment thereof Many other variations are possible. For example other means of actuation can be utilized. The rigid structures as described herein need not be flat. The flexible optical membrane can be sealably glued to rigid curved surfaces. The same Fresnel surfaces will be created and can be manipulated in identical ways to create other desirable effects. In the lens application, any two fluids can be used with this apparatus but one gas with a low index of refraction and one liquid with a high index of refraction is desirable. The term fluid as used herein is defined by any material that can conform to the shape of its container. Other transparent membranes with high elasticity and memory such as latex can be used in place of polyurethane. The optimal shape for Fresnel zones is generally round formed in concentric circles, however concentric shapes that are generally less efficient are also anticipated and incorporated herein (such as squares, hexagons, and ovals for example). Also, though the optimal design incorporates concentric zones that encompass 360 degrees at some constant distance from the center of the structure. Concentric zones of less than 360 degrees are anticipated herein. The prior art hasn't anticipated any variable Fresnel lens or mirrors.

Accordingly, the scope of the invention should be determined not by the embodiment(s) illustrated, but by the appended claims and their legal equivalents.

I claim:

1. An apparatus for controlling the focus of a light beam comprising: a fluid lens containing an optically transparent fluid in communication with least one optically transparent membrane forming at least one Fresnel zone, wherein the angular slope of said zone can be varied.

2. The apparatus of claim 1, wherein the curvature of said zone can be varied.

3. The apparatus of claim 1 wherein said fluid can be caused to go on a first side of said membrane to form a convex fluid lens.

4. The apparatus of claim 1 wherein said fluid can be caused to go on a second side of said membrane to form a concave fluid lens.

5. The apparatus of claim 1, wherein said membrane forms a series of generally concentric zones whereby each zone controls the deflection angle of a portion of an electromagnetic radiation beam.

6. The apparatus of claim 1, wherein a stretchable member in communication with said fluid is parallel to at least some of the incident electromagnetic radiation.

7. The apparatus of claim 1, wherein a stretchable member in communication with said fluid of at least one said zone is parallel to at least some of the exiting electromagnetic radiation.

8. The apparatus of claim 1, wherein the width of at least one concentric zone is different from that of another concentric zone.

9. The apparatus of claim 1, wherein the width of each of the concentric zones is the same.

10. The apparatus of claim 1, wherein each zone can be independently controlled as to curvature.

11. The apparatus of claim 1, wherein each concentric zone has the same angular slope.

12. The apparatus of claim 1, wherein at least two concentric zones have different angular slopes.

13. The apparatus of claim 1, wherein the cross section of at least one said zone is trihedral.

14. The apparatus of claim 1, wherein at least two concentric zones have different curvature.

15. An apparatus for controlling the focus of a light beam comprising: a fluid lens containing an optically transparent fluid in communication with least one optically transparent membrane forming at least one Fresnel zone, wherein the curvature of said zone can be varied.

16. The apparatus of claim 15, wherein the angular slope of said zone can be varied.

17. The apparatus of claim 15 wherein said fluid can be caused to go on a first side of said membrane to form a convex fluid lens.

18. The apparatus of claim 15 wherein said fluid can be caused to go on a second side of said membrane to form a concave fluid lens.

19. The apparatus of claim 15, wherein said membrane forms a series of generally concentric zones whereby each zone controls the deflection angle of a portion of an electromagnetic radiation beam.

20. The apparatus of claim 15, wherein a stretchable member in communication with said fluid is parallel to at least some of the incident electromagnetic radiation.

21. The apparatus of claim 15, wherein a stretchable member in communication with said fluid of at least one said zone is parallel to at least some of the exiting electromagnetic radiation.

22. The apparatus of claim 15, wherein the width of at least one concentric zone is different from that of another concentric zone.

23. The apparatus of claim 15, wherein the width of each of the concentric zones is the same.

24. The apparatus of claim 15, wherein each zone can be independently controlled as to curvature.

25. The apparatus of claim 15, wherein each concentric zone has the same angular slope.

26. The apparatus of claim 15, wherein at least two concentric zones have different angular slopes.

27. The apparatus of claim 15, wherein the cross section of at least one said zone is trihedral.

28. The apparatus of claim 15, wherein at least two concentric zones have different curvature.

29. An apparatus for controlling the focus of a light beam comprising: a fluid actuated mirror containing an optically transparent fluid in communication with least one optically reflective membrane which forms at least one Fresnel zone, wherein the angular slope of said zone can be varied.

30. The apparatus of claim 29, wherein the curvature of said zone can be varied.

31. The apparatus of claim 29, wherein said fluid is a gas.

32. The apparatus of claim 29, wherein said membrane forms a series of generally concentric zones whereby each zone controls the reflection angle of a portion of an electromagnetic radiation beam.

33. The apparatus of claim 29, wherein each zone can be independently controlled as to curvature.

34. The apparatus of claim 29, wherein the cross section of at least one said zone is trihedral.

35. An apparatus for controlling the focus of a light beam comprising: a fluid actuated mirror containing an optically transparent fluid in communication with least one optically reflective membrane which forms at least one Fresnel zone, wherein the curvature of said zone can be varied.

36. The apparatus of claim 35, wherein the angular slope of said zone can be varied.

37. The apparatus of claim 35, wherein said fluid is a gas.

38. The apparatus of claim 35, wherein said membrane forms a series of generally concentric zones whereby each zone controls the reflection angle of a portion of an electromagnetic radiation beam.

39. The apparatus of claim 35, wherein each zone can be independently controlled as to curvature.

40. The apparatus of claim 35, wherein the cross section of at least one said zone is trihedral.

* * * * *